United States Patent
Kim

(10) Patent No.: US 11,397,513 B2
(45) Date of Patent: *Jul. 26, 2022

(54) CONTENT TRANSMISSION DEVICE AND MOBILE TERMINAL FOR PERFORMING TRANSMISSION OF CONTENT

(71) Applicant: LG ELECTRONICS INC., Seoul (KR)

(72) Inventor: Dongsung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 63 days.

This patent is subject to a terminal disclaimer.

(21) Appl. No.: 17/064,397

(22) Filed: Oct. 6, 2020

(65) Prior Publication Data

US 2021/0019027 A1 Jan. 21, 2021

Related U.S. Application Data

(63) Continuation of application No. 15/490,637, filed on Apr. 18, 2017, now Pat. No. 10,884,581.

(30) Foreign Application Priority Data

Apr. 19, 2016 (KR) .......................... 10-2016-0047789

(51) Int. Cl.
*G06F 3/0482* (2013.01)
*H04N 21/436* (2011.01)
(Continued)

(52) U.S. Cl.
CPC ........... *G06F 3/0482* (2013.01); *G08C 17/02* (2013.01); *H04M 1/72415* (2021.01);
(Continued)

(58) Field of Classification Search
CPC ............ G06F 3/0488; H04N 21/43615; H04N 21/4126
See application file for complete search history.

(56) References Cited

U.S. PATENT DOCUMENTS 9,247,363 B2 1/2016 Triplett et al.
2003/0229900 A1 12/2003 Reisman
(Continued)

FOREIGN PATENT DOCUMENTS

CN 104978157 A * 10/2015
CN 105338383 A 2/2016
(Continued)

OTHER PUBLICATIONS

Chinese Office Action issued in Chinese Patent Application No. 201710281738.3 dated Sep. 4, 2019.
(Continued)

*Primary Examiner* — James T Tsai
(74) *Attorney, Agent, or Firm* — Birch, Stewart, Kolasch & Birch, LLP

(57) ABSTRACT

A mobile terminal including a display; a wireless communication processor configured to transmit a control signal to a content transmission device; and a controller configured to in response to an input for an execution of a content playback application, display a content playback setting screen on the display including a plurality of content reception devices, a plurality of input terminals of the content transmission device through which the content reception devices are connected to the content transmission device, and a plurality of thumbnail images corresponding to content data input via the respective input terminals, and in response to a selection of a first content reception device among the plurality of content reception devices and a selection of a first input terminal among the plurality of input terminals, transmit the content data received through the first
(Continued)

input terminal of the content transmission device to the first content reception device, and in response to a selection of the first content reception device and a selection of a second input terminal among the plurality of input terminals, transmit the content data received through the second input terminal of the content transmission device to the first content reception device.

19 Claims, 36 Drawing Sheets

(51) Int. Cl.
| | |
|---|---|
| *H04N 21/431* | (2011.01) |
| *H04N 21/422* | (2011.01) |
| *H04N 21/41* | (2011.01) |
| *H04M 1/72415* | (2021.01) |
| *G08C 17/02* | (2006.01) |
| *G08C 23/02* | (2006.01) |

(52) U.S. Cl.
CPC . *H04N 21/41265* (2020.08); *H04N 21/42204* (2013.01); *H04N 21/4312* (2013.01); *H04N 21/43615* (2013.01); *G08C 23/02* (2013.01); *G08C 2201/32* (2013.01); *H04N 21/422* (2013.01); *H04N 21/4222* (2013.01); *H04N 21/42224* (2013.01)

(56) References Cited

U.S. PATENT DOCUMENTS

| | | |
|---|---|---|
| 2006/0253782 A1 | 11/2006 | Stark et al. |
| 2006/0253874 A1* | 11/2006 | Stark .................. H04N 21/8166 725/62 |
| 2010/0194985 A1 | 8/2010 | Unger et al. |
| 2010/0216399 A1 | 8/2010 | Hong et al. |
| 2011/0060998 A1 | 3/2011 | Schwartz et al. |
| 2011/0105879 A1 | 5/2011 | Masumoto |
| 2013/0332956 A1 | 12/2013 | Lee et al. |
| 2014/0188985 A1 | 7/2014 | Park et al. |
| 2014/0362294 A1 | 12/2014 | Majid |
| 2014/0368716 A1 | 12/2014 | Maruyama et al. |
| 2015/0179219 A1 | 6/2015 | Gao et al. |

FOREIGN PATENT DOCUMENTS

| | | |
|---|---|---|
| WO | WO 2012/015118 A1 | 2/2012 |
| WO | WO 2015/174753 A1 | 11/2015 |

OTHER PUBLICATIONS

Heimkinoraum, "Yamaha AV Controller App im Test/Vorstellung deutsch," YouTube, URL: https://www.youtube.com/watch?v=rA1cLM1PATY, Aug. 7, 2015, 2 pages, XP054977623.

Squirrel Blog, "Introducing AirParrot Remote", Mar. 14, 2016, URL: https://blog.airsquirrels.com/screen-mirroring/2016/03/introducing-airparrot-remote.

* cited by examiner (a) (b) (c)

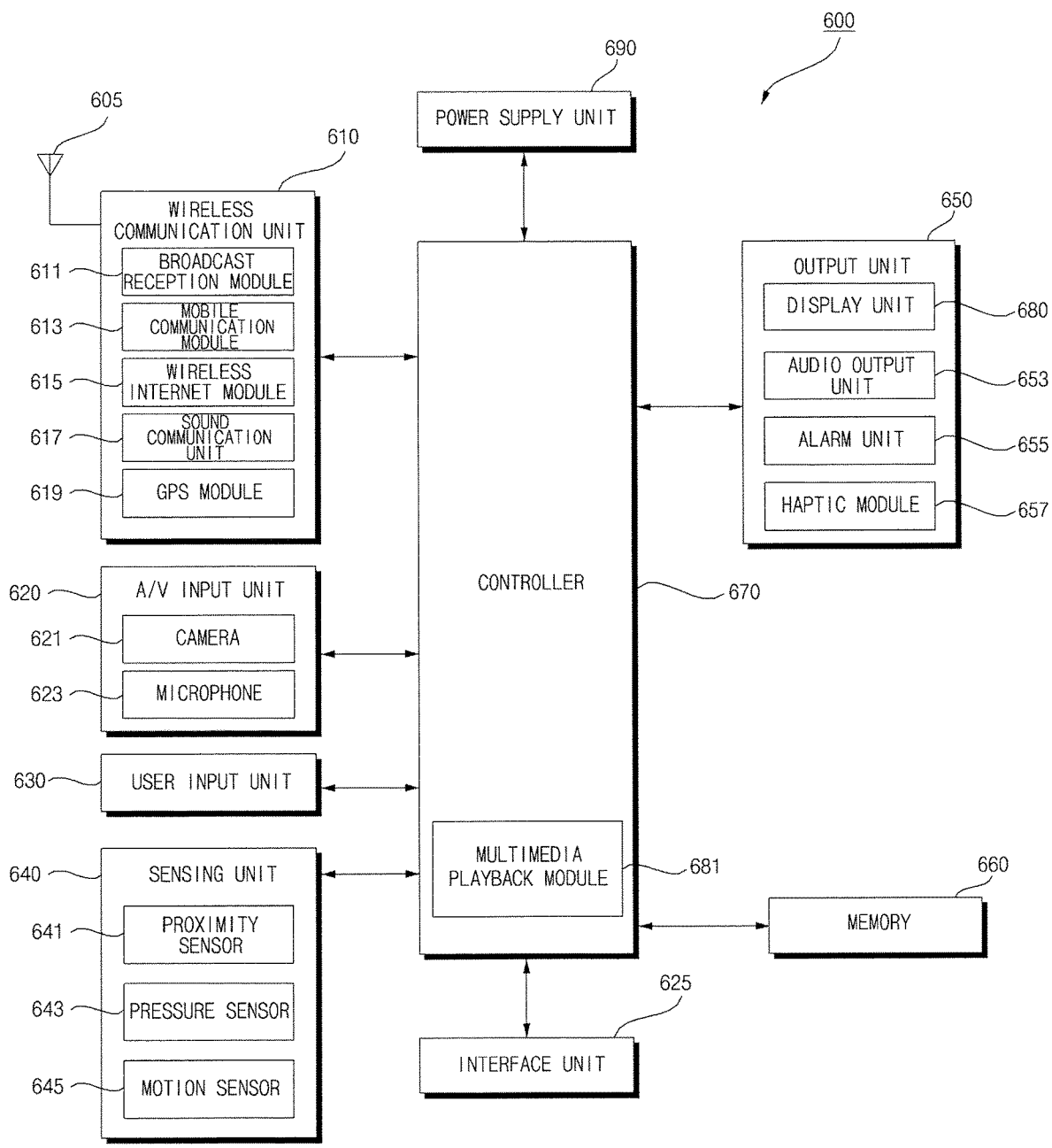

CONTENT TRANSMISSION DEVICE AND MOBILE TERMINAL FOR PERFORMING TRANSMISSION OF CONTENT

CROSS-REFERENCE TO RELATED APPLICATION

This application is a Continuation of copending application Ser. No. 15/490,637, filed on Apr. 18, 2017, which claims priority under 35 U.S.C. § 119(a) to Application No. 10-2016-0047789, filed in Republic of Korea on Apr. 19, 2016, all of which are hereby expressly incorporated by reference into the present application.

BACKGROUND OF THE INVENTION

1. Field of the Invention

The present invention relates to a content transmission device and a mobile terminal, and more particularly to a content transmission device and a mobile terminal that is capable of easily performing the transmission of content from the content transmission device.

2. Description of the Related Art

A mobile terminal is a portable device having one or more functions, such as a function of performing voice and video communications, a function of inputting and outputting information, and a function of storing data. As the result of diversification of the functions of the mobile terminal, the mobile terminal has come to have complex functions, such as a function of taking still pictures or motion pictures, a function of playing music files or video files, a function of playing games, a function of receiving broadcasts, a function of providing wireless Internet access, and a function of transmitting and receiving messages. Owing to the diversified functions, the mobile terminal has been realized in the form of a total multimedia player. Various attempts based on hardware or software have been made in order for the mobile terminal realized in the form of the multimedia player to have increasingly complex functions.

SUMMARY OF THE INVENTION

It is an object of the present invention to provide a content transmission device and a mobile terminal that is capable of easily performing the transmission of content from the content transmission device.

In accordance with an aspect of the present invention, the above and other objects can be accomplished by the provision of a mobile terminal including a display unit, a communication unit to transmit a control signal to a content transmission device, and a controller to display a content playback setting screen, including an item related to at least one content reception device, an item related to at least one input terminal through which the at least one content reception device is connected to the content transmission device, and a thumbnail image corresponding to the item related to the at least one input terminal, in response to an input for the execution of a content playback application, wherein the controller performs a control operation to transmit content data received through a first input terminal of the content transmission device to a first content reception device based on the selection of the first content reception device from among the at least one content reception device and the selection of the first input terminal from among the at least one input terminal.

In accordance with another aspect of the present invention, there is provided a mobile terminal including a display unit, a communication unit to transmit a control signal to a content transmission device, and a controller to display a content playback setting screen, including a power on item, a power off item, an input item, and a thumbnail image corresponding to the input item, in response to an input for the execution of a content playback application, wherein the controller performs a control operation to transmit content data received through a first input terminal of the content transmission device to a content reception device based on the selection of the first input terminal as the input item.

In accordance with a further aspect of the present invention, there is provided a content transmission device including a communication unit to exchange data with a mobile terminal, an interface unit having a plurality of input terminals to receive content data from a plurality of external devices, and a controller to perform a control operation to, when receiving, from the mobile terminal, transmit a remote control signal in response to the selection of a first content reception device from among at least one content reception device and the selection of a first input terminal from among the input terminals, content data received through the first input terminal of the content transmission device to the first content reception device.

BRIEF DESCRIPTION OF THE DRAWINGS

The above and other objects, features and other advantages of the present invention will be more clearly understood from the following detailed description taken in conjunction with the accompanying drawings, in which:

FIG. 5 is an internal block diagram of a mobile terminal shown in FIG. 1;

DETAILED DESCRIPTION OF THE PREFERRED EMBODIMENTS

Exemplary embodiments of the present invention will be described with reference to the attached drawings. The terms "module" and "unit," when attached to the names of components, are used herein to help the understanding of the components and thus they should not be considered as having specific meanings or roles. Accordingly, the terms "module" and "unit" may be used interchangeably.

Figure 1:
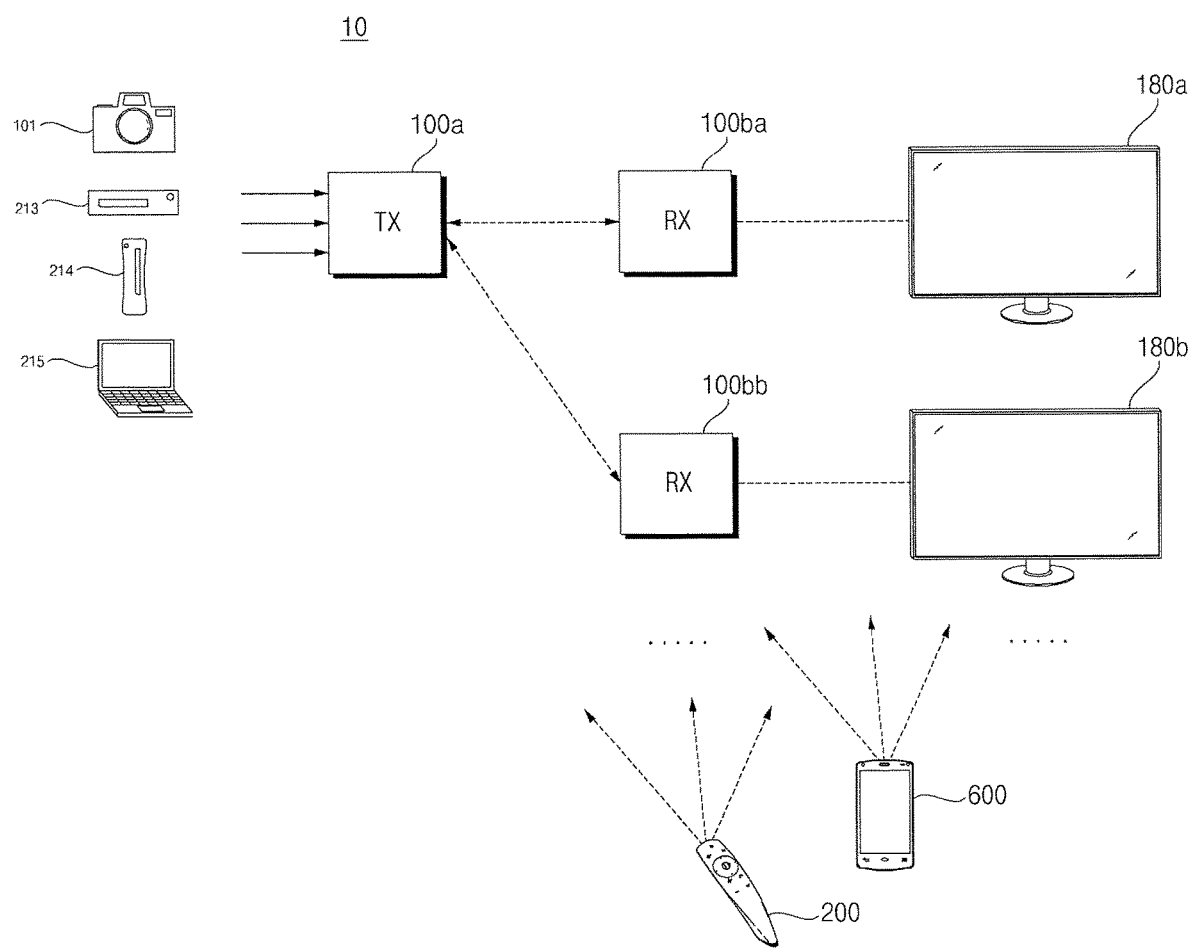
FIG. 1 is a view showing a video display system based on the wireless transmission of content data according to an embodiment of the present invention.

FIG. 1 is a view showing a video display system based on the wireless transmission of content data according to an embodiment of the present invention. Referring to this figure, the video display system based on the wireless transmission of content data, denoted by reference numeral 10, may include a content transmission device 100*a*, at least one content reception device 100*ba*, 100*bb*, . . . (which may also be denoted by 100*b*), at least one display device 180*a*, 180*b*, . . . , a remote controller 200, and a mobile terminal 600.

The content transmission device 100*a* may have a plurality of input terminals to receive content data from a plurality of external devices. The content transmission device 100*a* can transmit content data, input from one of the external devices through a corresponding one of the input terminals, to one of the at least one content reception device 100*ba*, 100*bb*, . . . in a wireless fashion.

The external devices that are connected to the content transmission device 100*a* may be a camera device 101, an optical disk player 213, a game console 214, a laptop computer 215, a set-top box, etc., as shown in this figure. In addition, the input terminals of the content transmission device 100*a* may be an antenna terminal, a universal serial bus (USB) terminal, a high definition multimedia interface (HDMI) terminal, a wired local area network (LAN) terminal, an RGB terminal, an audio/video (AV) terminal, an S-video terminal, a Sony and Philips digital interconnect format (SPDIF) terminal, a secure digital (SD) terminal, a micro-SD terminal, a compact flash (CF) terminal, etc.

The at least one content reception device 100*ba*, 100*bb*, . . . can receive predetermined content data from the content transmission device 100*a* in a wireless fashion, and can transmit the received content data to the at least one display device 180*a*, 180*b*, . . . in a wireless fashion. Further, the at least one display device 180*a*, 180*b*, . . . can display a video that corresponds to the wirelessly received content data.

Examples of the at least one display device 180*a*, 180*b*, . . . include a monitor, a TV receiver, etc. Meanwhile, a content reception device and a display device may be integrated into a single device. An example of such an integrated device may be a tablet device.

The remote controller 200 and the mobile terminal 600 can each remotely control at least one selected from among the content transmission device 100*a*, the at least one content reception device 100*ba*, 100*bb*, . . . , and the at least one display device 180*a*, 180*b*, For example, the remote controller 200 can transmit a power on signal, a power off signal, a channel control signal, or a volume control signal to the content transmission device 100*a*, the at least one content reception device 100*ba*, 100*bb*, . . . , and the at least one display device 180*a*, 180*b*, . . . in a wireless fashion.

The power on signal, the power off signal, the channel control signal, or the volume control signal may be transmitted as an infrared (IR) signal. Further, the remote controller 200 can transmit a pointing signal for remote control pointing to at least one selected from among the content transmission device 100*a*, the at least one content reception device 100*ba*, 100*bb*, . . . , and the at least one display device 180*a*, 180*b*, . . . .

The pointing signal may be a radio frequency (RF) signal, rather than an IR signal. The mobile terminal 600 can transmit a power on signal, a power off signal, a channel control signal, or a volume control signal to the content transmission device 100*a*, the at least one content reception device 100*ba*, 100*bb*, . . . , and the at least one display device 180*a*, 180*b*, . . . in a wireless fashion.

The power on signal, the power off signal, the channel control signal, or the volume control signal may be transmitted as an IR signal. Further, the mobile terminal 600 can transmit a pointing signal for remote control pointing to at least one selected from among the content transmission device 100*a*, the at least one content reception device 100*ba*, 100*bb*, . . . , and the at least one display device 180*a*, 180*b*, . . . . The pointing signal may also be an RF signal, rather than an IR signal.

The mobile terminal 600 can transmit a selection signal for selecting one of the at least one content reception device 100*ba*, 100*bb*, . . . to the content transmission device 100*a*, and can transmit a selection signal for selecting one of the input terminals of the content transmission device 100*a* or selecting one of content data from the external devices to the content transmission device 100*a*.

Particularly, in an embodiment of the present invention, the mobile terminal 600 can transmit content data received through a first input terminal of the content transmission device 100*a* to a first content reception device 100*ba* based on the selection of the first content reception device 100*ba* from among the at least one content reception device 100*b* and the selection of the first input terminal from among the input terminals of the content transmission device 100*a* when a content playback setting screen including an item related to the at least one content reception device 100*b*, an item related to at least one of the input terminals through which the at least one content reception device 100*b* is connected to the content transmission device 100*a*, and a thumbnail image corresponding to the item related to the at least one of the input terminals, is displayed in response to an input for the execution of a content playback application. Consequently, it is possible to easily perform the transmission of content from the content transmission device 100*a* through the mobile terminal 600.

Further, the mobile terminal 600 can display a screen for wireless pairing between the content transmission device 100*a* and the first content reception device 100*ba* in response to the selection of the first content reception device 100*ba* from among the at least one content reception device 100*b* and the selection of the first input terminal from among the input terminals of the content transmission device 100*a* such that pairing between the content transmission device 100*a* and the first content reception device 100*ba* is performed before the transmission of content, whereby the transmission of content is easily performed.

Meanwhile, when the content transmission device 100*a* transmits content data to the first content reception device 100*ba* in a first frequency band, the mobile terminal 600 can display a first object indicating that content data are being transmitted in the first frequency band. When the content transmission device 100*a* transmits content data to the first content reception device 100*ba* in a second frequency band, the mobile terminal 600 can display a second object indicating that content data are being transmitted in the second frequency band. When the content transmission device 100*a* transmits content data to the first content reception device 100*ba* in a third frequency band, the mobile terminal 600 can display a third object indicating that content data are being transmitted in the third frequency band. Consequently, it is possible to easily recognize the frequency band in which the content transmission device 100*a* is transmitting content data to the first content reception device 100*ba*.

Further, the mobile terminal 600 can variably display the number of thumbnail images corresponding to the input terminals according to the item related to the at least one content reception device 100*b* that is selected in the content playback setting screen. Consequently, it is possible to easily recognize viewable content received through each input terminal.

The mobile terminal 600 can receive content data and display the received content data in a portion of the screen. In addition, the mobile terminal 600 can transmit information set based on a setting input of at least one selected from among the image size, playback time, fast-forward, and volume of a video based on the displayed content data to the content transmission device 100a. Consequently, it is possible to improve user convenience.

When a second content reception device 100bb is further selected from among the at least one content reception device 100b and a second input terminal is further selected from among the input terminals of the content transmission device 100a, the mobile terminal 600 can perform a control operation to further transmit second content data received through the second input terminal of the content transmission device 100a to the second content reception device 100bb. Consequently, it is possible to transmit a plurality of pieces of content data.

In another embodiment of the present invention, the mobile terminal 600 can include a display unit 680, a communication unit 610 for transmitting a control signal to the content transmission device 100a, and a controller 670 for performing control such that a content playback setting screen, including a power on item, a power off item, an input item, and a thumbnail image corresponding to the input item, is displayed in response to an input for the execution of a content playback application. The controller 670 can transmit content data received through the first input terminal of the content transmission device 100a to the at least one content reception device 100b based on the selection of the first input terminal as the input item. Consequently, it is possible to easily perform the transmission of content from the content transmission device 100a.

Further, the mobile terminal 600 can perform a control operation to power on the content transmission device 100a and the at least one content reception device 100b by transmitting power on signals to the content transmission device 100a and the at least one content reception device 100b when the power on item in the content playback setting screen is selected.

The mobile terminal 600 can transmit a pairing signal to the content transmission device 100a after the content transmission device 100a is powered on in response to the power on signal, and may be connected to the content transmission device 100a based on a pairing response signal received from the content transmission device 100a. Consequently, it is possible to easily perform pairing.

Further, in an embodiment of the present invention, the content transmission device 100a may include a communication unit 135 for exchanging data with the mobile terminal 600, an interface unit 130 having a plurality of input terminals to receive content data from a plurality of external devices, and a controller 170 for performing control such that content data received through the first input terminal of the content transmission device 100a are transmitted to the first content reception device 100ba when receiving, from the mobile terminal 600, a remote control signal in response to the selection of the first content reception device 100ba from among the at least one content reception device 100b and the selection of the first input terminal from among the input terminals of the content transmission device 100a. Consequently, it is possible to easily perform the transmission of content from the content transmission device 100a.

The content transmission device 100a can transmit a pairing signal to the first content reception device 100ba when receiving, from the mobile terminal 600, a remote control signal in response to the selection of the first content reception device 100ba from among the at least one content reception device 100b and the selection of the first input terminal from among the input terminals of the content transmission device 100a, and can perform pairing based on a pairing response signal received from the first content reception device 100ba. Consequently, it is possible to easily perform the transmission of content from the content transmission device 100a.

The content transmission device 100a can transmit content data received through the first input terminal of the content transmission device 100a to the first content reception device 100ba in any one selected from among the first frequency band to the third frequency band depending on the state of the wireless connection between the content transmission device 100a and the first content reception device 100ba. Consequently, it is possible to transmit content data without loss or delay.

The operation of the content transmission device 100a, the mobile terminal 600, etc. will be described in more detail with reference to FIG. 6 and subsequent figures. In particular, FIG. 2A is an internal block diagram of an example of the content transmission device shown in FIG. 1.

Figure 2A:
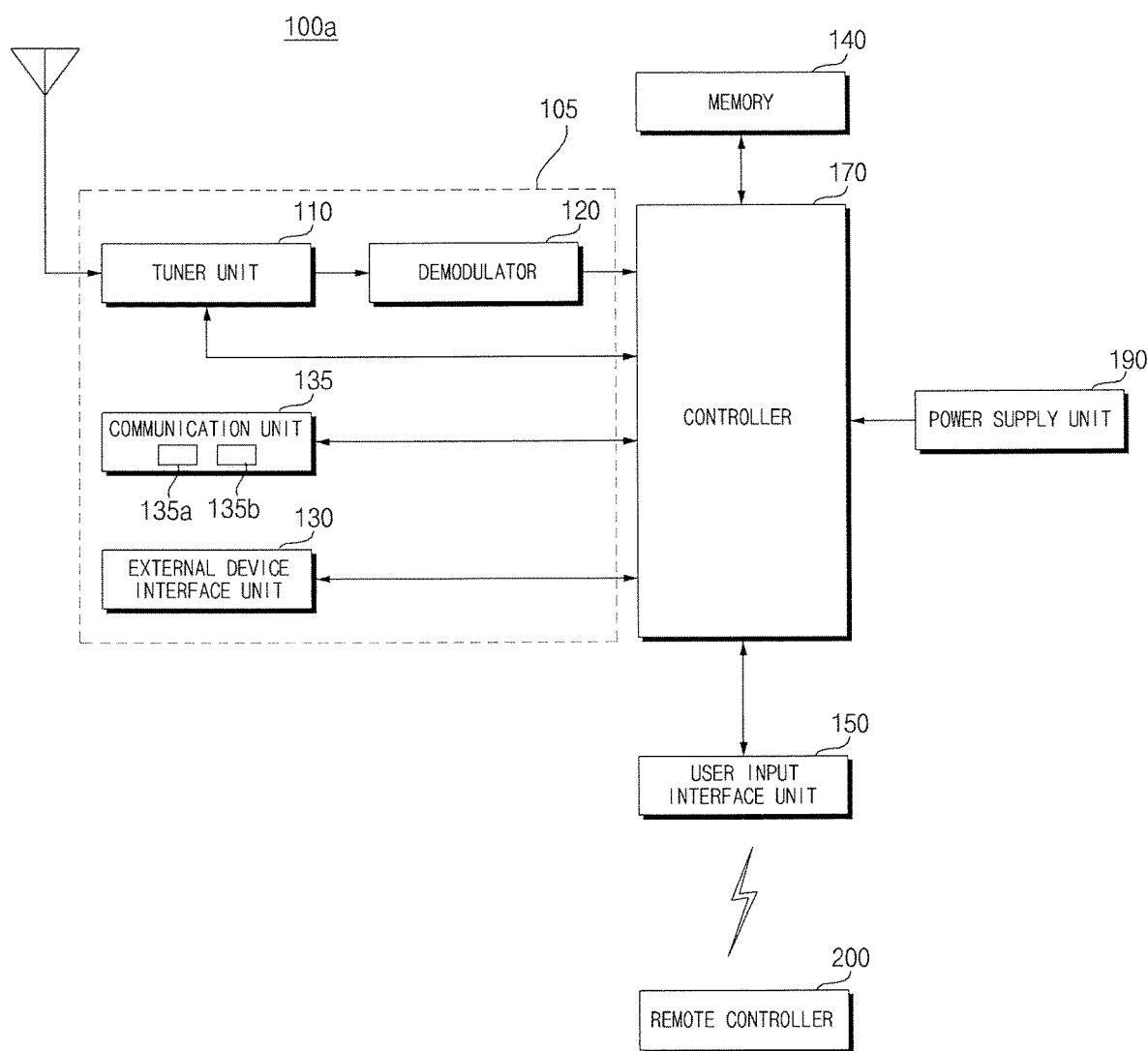
FIG. 2A is an internal block diagram of an example of a content transmission device shown in FIG. 1.

Referring to FIG. 2A, in an embodiment of the present invention, the content transmission device 100a may include a broadcast reception unit 105, a memory 140, a user input interface unit 150, a sensor unit, a controller 170, and a power supply unit 190. The broadcast reception unit 105 may include a tuner unit 110, a demodulator 120, a communication unit 135, and an external device interface unit 130.

Unlike what is shown in this figure, the broadcast reception unit 105 may include only the tuner unit 110 and the demodulator 120. That is, the broadcast reception unit 105 may not include the communication unit 135 or the external device interface unit 130. The tuner unit 110 tunes to a radio frequency (RF) broadcast signal corresponding to a channel selected by a user or all pre-stored channels from among RF broadcast signals received through an antenna terminal. In addition, the tuner unit 110 converts the tuned RF broadcast signal into an intermediate frequency (IF) signal or a baseband video or audio signal.

For example, when the selected RF broadcast signal is a digital broadcast signal, the tuner unit 110 converts the selected RF broadcast signal into a digital IF (DIF) signal. When the selected RF broadcast signal is an analog broadcast signal, the tuner unit 110 converts the selected RF broadcast signal into an analog baseband video or audio signal (CVBS/SIF). That is, the tuner unit 110 can process the digital broadcast signal or the analog broadcast signal. The analog baseband video or audio signal (CVBS/SIF) output from the tuner unit 110 may be directly input to the controller 170.

Also, in the present invention, the tuner unit 110 may sequentially tune to RF broadcast signals of all broadcast channels stored using a channel memory function, among RF broadcast signals received through the antenna, and may convert the tuned RF broadcast signals into intermediate frequency signals or baseband video or audio signals.

The tuner unit 110 may include a plurality of tuners in order to receive broadcast signals of a plurality of channels. Alternatively, the tuner unit 110 may include a single tuner that is capable of simultaneously receiving broadcast signals of a plurality of channels.

The demodulator 120 can receive the digital IF (DIF) signal converted by the tuner unit 110, and can perform demodulation. After performing demodulation and channel decoding, the demodulator 120 may output a stream signal (TS). In this instance, the stream signal may be a multiplexed video signal, a multiplexed audio signal, or a multiplexed data signal.

The stream signal output from the demodulator 120 may be input to the controller 170. The controller 170 can perform demultiplexing, video/audio signal processing, etc. Subsequently, the controller 170 can transmit the processed signal to the at least one content reception device 100ba, 100bb, . . . in a wireless fashion. The external device interface unit 130 may include an antenna terminal, a USB terminal, an HDMI terminal, a wired LAN terminal, an RGB terminal, an AV terminal, an S-video terminal, an SPDIF terminal, an SD terminal, a micro-SD terminal, and a CF terminal.

The external device interface unit 130 can transmit or receive data to or from an external device, such as a set-top box, connected through one of the input terminals. Thus, the external device interface unit 130 may include an A/V input and output unit.

The external device interface unit 130 may be connected to an external device, such as a digital versatile disk (DVD) player, a Blu-ray player, a game console, a camera, a camcorder, a computer (a laptop computer), or a set-top box, in a wired or wireless fashion. In addition, the external device interface unit 130 can perform an input operation to or an output operation from the external device. The A/V input and output unit can receive a video signal and an audio signal from the external device.

The communication unit 135 may provide an interface for connecting the content transmission device 100a to a wired or wireless network, including the Internet. For example, the communication unit 135 can receive content or data provided by a content provider or a network operator over a network, such as the Internet.

The communication unit 135 may include a wired communication unit 135a and a wireless communication unit 135b. The communication unit 135 may also exchange data with the mobile terminal 600 or the remote controller 200 through the wireless communication unit 135b.

The memory 140 may store a program for processing and controlling signals in the controller 170. Alternatively, the first storage unit 140 may store a processed video, audio, or data signal. In addition, the memory 140 may temporarily store a video, audio, or data signal input to the external device interface unit 130. Furthermore, the memory 140 may store information about a specific broadcast channel using a channel memory function, such as a channel map.

In FIG. 2A, the memory 140 is provided separately from the controller 170. However, the present invention is not limited thereto. For example, the memory 140 may be included in the controller 170. The user input interface unit 150 may transfer a signal input by a user to the controller 170, or may transfer a signal from the controller 170 to the user.

For example, the user input interface unit 150 can transmit/receive a user input signal, such as power on/off, channel selection, or screen setting, to/from the remote controller 200 or the mobile terminal 600, can transfer a user input signal input from a local key, such as a power key, a channel key, a volume key, or a setting key, to the controller 170, can transfer a user input signal input from a sensor unit for sensing a gesture of a user to the controller 170, or can transmit a signal from the controller 170 to the sensor unit.

The controller 170 can demultiplex streams input through the tuner unit 110, the demodulator 120, the communication unit 135, or the external device interface unit 130, or can process the demultiplexed signals to generate and output a video or audio output signal. The video signal processed by the controller 170 may be transmitted to the at least one content reception device 100ba, 100bb, . . . in a wireless fashion.

The audio signal processed by the controller 170 may be transmitted to the at least one content reception device 100ba, 100bb, . . . in a wireless fashion. Further, the controller 170 may include a demultiplexer and a video processing unit, which will hereinafter be described with reference to FIG. 3.

In addition, the controller 170 can control the operations of the respective units in the content transmission device 100a. The power supply unit 190 may supply power to the content transmission device 100a. In particular, the power supply unit 190 may supply power to the controller 170, which may be embodied in the form of a system on chip (SOC). Specifically, the power supply unit 190 may include an AC/DC converter for converting AC power into DC power and a DC/DC converter for changing the level of the DC power.

The remote controller 200 can transmit a user input to the user input interface unit 150. Thus, the remote controller 200 may use Bluetooth communication, radio frequency (RF) communication, infrared (IR) communication, ultra wideband (UWB) communication, or ZigBee communication. In addition, the remote controller 200 can receive a video, audio, or data signal output from the user input interface unit 150 such that the remote controller 200 displays the received signal or outputs the received signal in the form of audible sound.

The content transmission device 100a may be a fixed or mobile digital broadcast receiver that is capable of receiving a digital broadcast. The block diagram of the content transmission device 100a shown in FIG. 2A is a view illustrating an embodiment of the present invention. The respective components of the block diagram may be combined, added, or omitted depending on the specifications of the content transmission device 100a that is actually embodied. That is, two or more components may be combined into a single component or one component may be divided into two or more components as needed. In addition, the function performed by each block is intended for description of the embodiment of the invention, and its detailed action or device does not limit the scope of the invention.

Figure 2B:
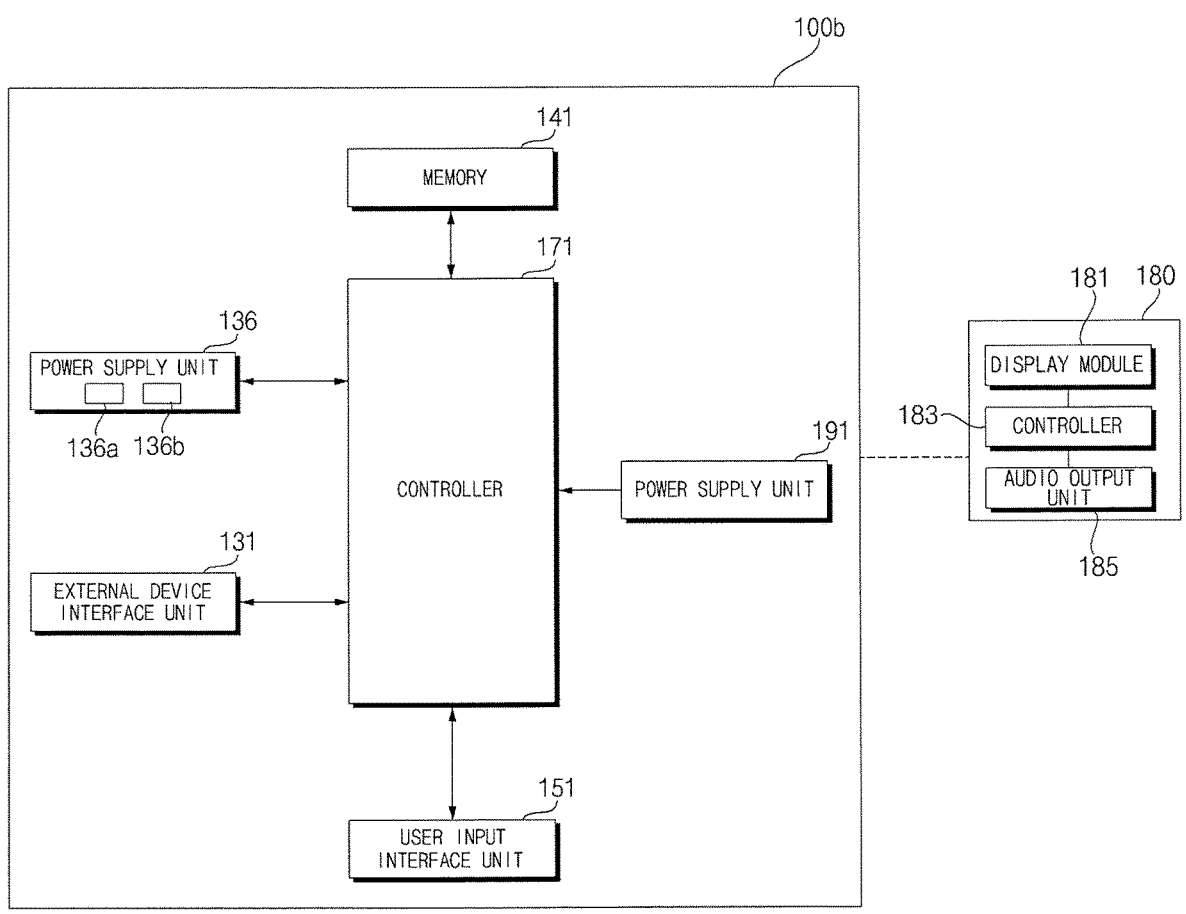
FIG. 2B is an internal block diagram of an example of a content reception device shown in FIG. 1.

Next, FIG. 2B is an internal block diagram of an example of a content reception device shown in FIG. 1. Referring to FIG. 2B, in an embodiment of the present invention, the content reception device 100b may include a communication unit 136, an external device interface unit 131, a memory 141, a user input interface unit 151, a controller 171, and a power supply unit 191.

The operation of the external device interface unit 131, the memory 141, the user input interface unit 151, the controller 171, and the power supply unit 191 may be similar to the operation of the external device interface unit 130, the memory 140, the user input interface unit 150, the controller 170, and the power supply unit 190 of the content transmission device 100a shown in FIG. 2A.

The communication unit 136 can receive content data from the content transmission device 100a in a wireless fashion, and may directly transmit the received content data to a display device 180 in a wireless fashion without additional signal processing. Alternatively, the communication unit 136 can receive content data from the content transmission device 100a in a wireless fashion, and can transmit the content data to a display device 180 in a wireless fashion after the content data is processed by the controller 171.

Thus, the communication unit 136 may include a first communication unit 136a and a second communication unit 136b. The first communication unit 136a can receive content data from the content transmission device 100a, and the second communication unit 136b can transmit the content data to the display device 180 in a wireless fashion.

The display device 180 may include a display module 181, a controller 183, an audio output unit 185, and a communication unit. In addition, the communication unit can receive content data from the content reception device 100b in a wireless fashion.

The controller 183 can process the received content data. The video signal processed by the controller 171 may be input to the display module 181 such that a video based on the video signal is displayed on the display module 181. The controller 183 can process the received content data. The audio signal processed by the controller 171 may be output through the audio output unit 185 in the form of audible sound.

Figure 3:
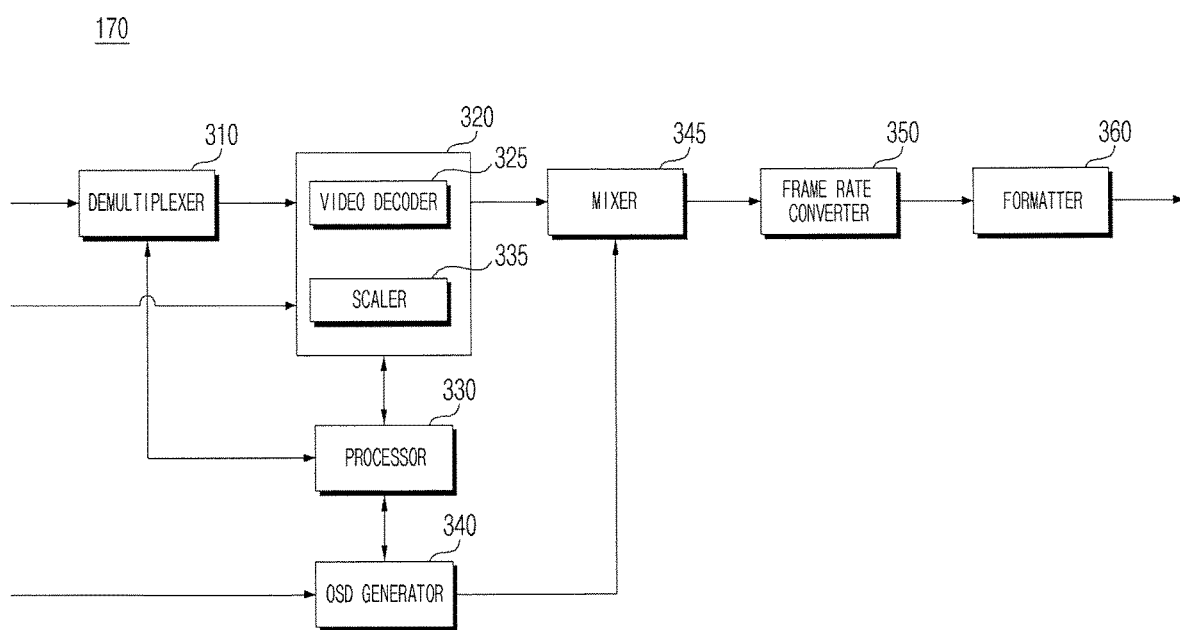
FIG. 3 is an internal block diagram of an example of a controller shown in FIG. 2A.

Next, FIG. 3 is an internal block diagram of an example of the controller shown in FIG. 2A. Referring to this figure, in an embodiment of the present invention, the controller 170 may include a demultiplexer 310, a video processing unit 320, a processor 330, an on-screen display (OSD) generator 340, a mixer 345, a frame rate converter (FRC) 350, and a formatter 360. In addition, the controller 170 may further include an audio processing unit and a data processing unit.

The demultiplexer 310 can demultiplex an input stream. For example, when an MPEG-2 TS is input, the demultiplexer 310 can demultiplex the MPEG-2 TS into video, audio, and data signals. The stream signal that is input to the demultiplexer 310 may be a stream signal output from the tuner unit 110, the demodulator 120, or the external device interface unit 130.

The video processing unit 320 can process a demultiplexed video signal. Thus, the video processing unit 320 may include a video decoder 325 and a scaler 335. The video decoder 325 can decode the demultiplexed video signal, and the scaler 335 can scale the resolution of the decoded video signal such that the video signal can be output to the at least one display device 180a, 180b, . . . .

Decoders based on various standards may be used as the video decoder 325. For example, an MPEG-2 decoder, an H264 decoder, a 3D image decoder, such as a color image decoder or a depth image decoder, or a multi-viewpoint image decoder may be used as the video decoder 325.

The processor 330 controls the overall operation of the content transmission device 100a or the controller 170. For example, the processor 330 can control the tuner unit 110 to tune to an RF broadcast corresponding to a channel selected by a user or a pre-stored channel. In addition, the processor 330 can control the content transmission device 100a based on a user command input through the user input interface unit 150 or an internal program.

Furthermore, the processor 330 can control data transmission to the communication unit 135 or the external device interface unit 130. In addition, the processor 330 can control the operation of the demultiplexer 310, the video processing unit 320, and the OSD generator 340 of the first processor 170.

The OSD generator 340 can generate an OSD signal, either in response to a user input or autonomously. For example, the OSD generator 340 can generate a signal for displaying various kinds of information on the screen of the at least one display device 180a, 180b, . . . in the form of graphics or text based on a user input signal. The generated OSD signal may include various data from the content transmission device 100a, such as user interface screens, various menu screens, widgets, and icons. In addition, the generated OSD signal may include a 2D object or a 3D object.

In addition, the OSD generator 340 can generate a pointer that can be displayed on the display unit based on a pointing signal input from the remote controller 200. In particular, the pointer may be generated by a pointing signal processing unit. The OSD generator 340 may include such a pointing signal processing unit. Of course, the pointing signal processing unit may not be provided in the OSD generator 340 but may be provided separately.

The mixer 345 can mix the OSD signal, generated by the OSD generator 340, with the decoded video signal processed by the video processing unit 320. The mixed video signal may be provided to the frame rate converter 350. The frame rate converter 350 can convert the frame rate of an input video. Alternatively, the frame rate converter 350 may directly output an input video without converting the frame rate of the input video.

The formatter 360 can arrange left-eye video frames and right-eye video frames of a 3D video, the frame rate of which has been converted. In addition, the formatter 360 can output a synchronizing signal Vsync for opening a left-eye glass and a right-eye glass of a 3D viewing device.

The formatter 360 can change the format of the input video signal into the format of a video signal that is to be displayed on the display device, and may output the changed video signal. In addition, the formatter 360 can change the format of a 3D video signal. For example, the formatter 360 may change the format of the 3D video signal into any one selected from among various 3D formats, such as a side-by-side format, an up-and-down format, a sequential frame format, an interlaced format, and a checker box format.

The formatter 360 can convert a 2D video signal into a 3D video signal. For example, the formatter 360 can detect an edge or a selectable object in a 2D video signal, and separate an object based on the detected edge or the selectable object from the 2D video signal to generate a 3D video signal according to a 3D video generation algorithm. As described above, the generated 3D video signal may be divided into a left-eye video signal L and a right-eye video signal R, which may be arranged appropriately.

In addition, a 3D processor for processing 3D effects may be further provided after the formatter 360. The 3D processor can control the brightness, tint, and color of a video signal in order to improve the 3D effects. For example, the 3D processor can perform signal processing in order to sharpen nearby items and to blur distant items. The function of the 3D processor may be incorporated into the formatter 360 or the video processing unit 320.

The audio processing unit in the controller 170 can process a demultiplexed audio signal. Thus, the audio processing unit may include various decoders. In addition, the audio processing unit in the controller 170 can control the bass, treble, and volume of an audio signal.

The data processing unit in the controller 170 can process a demultiplexed data signal. For example, when the demultiplexed data signal is an encoded data signal, the data processing unit can decode the demultiplexed data signal.

The encoded data signal may be electronic program guide (EPG) information containing broadcast information, such as a start time and an end time, of a broadcast program provided by each channel.

The block diagram of the controller 170 shown in FIG. 3 is a view illustrating an embodiment of the present invention. The respective components of the block diagram may be combined, added, or omitted depending on the specifications of the controller 170 that is actually embodied. In particular, the frame rate converter 350 and the formatter 360 may not be provided in the controller 170 but may be separately provided.

Figure 4A:
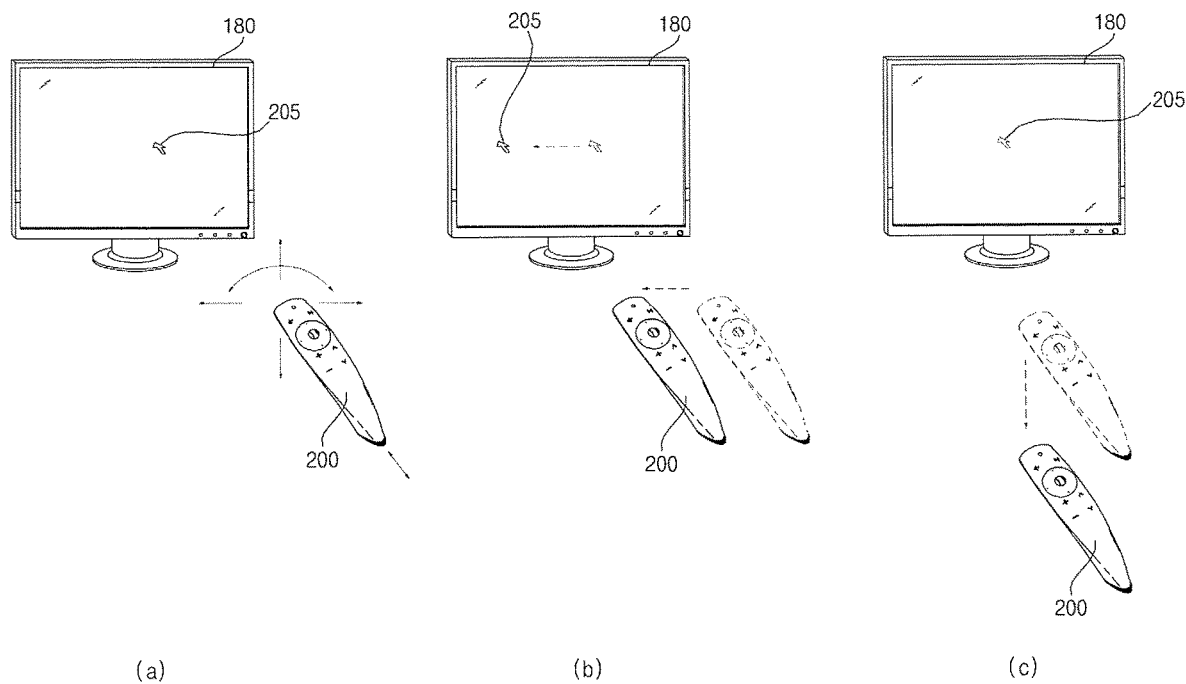
FIG. 4A is a view showing a control method of a remote controller shown in FIG. 2A.

FIG. 4A is a view showing a control method of the remote controller shown in FIG. 2A. As shown in FIG. 4A(a), a pointer 205 corresponding to the remote controller 200 is displayed on the display device 180. A user can move or rotate the remote controller 200 up and down, side to side (FIG. 4A(b)), or back and forth (FIG. 4A(c)). The pointer 205 displayed on the display device 180 corresponds to the motion of the remote controller 200. Since the pointer 205 corresponding to the remote controller 200 is moved and displayed in response to the motion of the remote controller 200 in a 3D space, as shown in these figures, the remote controller 200 can be named a spatial remote controller or a 3D pointing device.

FIG. 4A(b) illustrates that, when the user moves the remote controller 200 to the left, the pointer 205 moves to the left on the display device 180 in response to the motion of the remote controller 200. Information about the motion of the remote controller 200, sensed by a sensor of the remote controller 200, is transmitted to the content transmission device. The content transmission device may calculate the coordinates of the pointer 205 from information about the motion of the remote controller 200. The content transmission device may display the pointer 205 such that the pointer 205 corresponds to the calculated coordinates.

FIG. 4A(c) illustrates when the user moves the remote controller 200 away from the display device 180 while pressing a specific button on the remote controller 200. As a result, the selected area in the display device 180 corresponding to the pointer 205 can be zoomed in, and thus enlarged, on the display device 180. When the user moves the remote controller 200 toward the display device 180, the selected area in the display device 180 corresponding to the pointer 205 can be zoomed out, and thus contracted, on the display device 180. Alternatively, the selected area may be zoomed out when the remote controller 200 moves away from the display device 180, and the selected area may be zoomed in when the remote controller 200 moves toward the display device 180.

The upward, downward, leftward, and rightward movement of the remote controller 200 may not be recognized in the state in which a specific button of the remote controller 200 is pressed. That is, when the remote controller 200 moves away from or toward the display device 180, the upward, downward, leftward, and rightward movement of the remote controller 200 may not be recognized, but only the forward and rearward movement of the remote controller 200 may be recognized. In the state in which a specific button of the remote controller 200 is not pressed, only the pointer 205 moves in response to the upward, downward, leftward, and rightward movement of the remote controller 200. The movement speed or direction of the pointer 205 may correspond to the movement speed or direction of the remote controller 200.

Figure 4B:
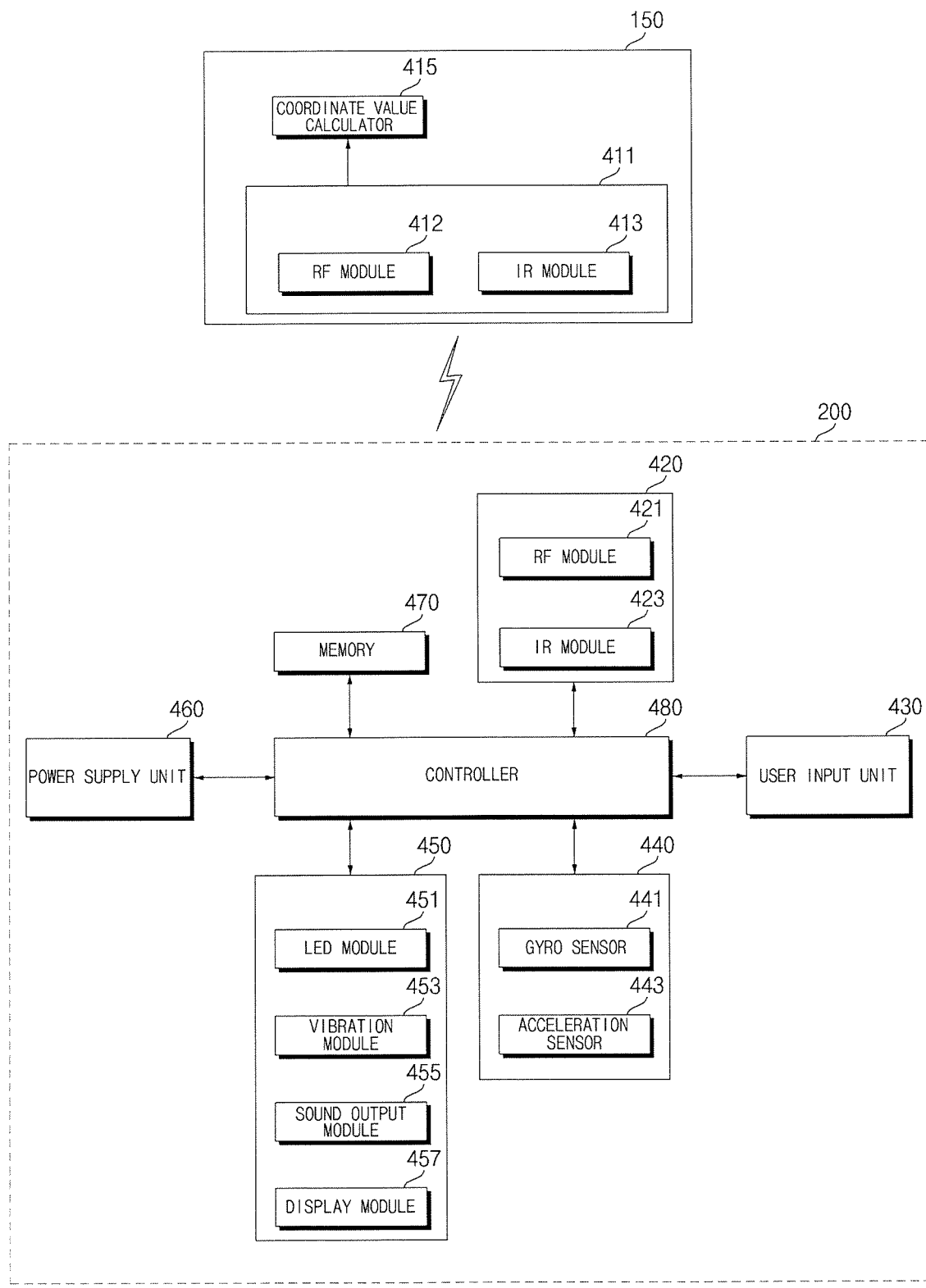
FIG. 4B is an internal block diagram of the remote controller shown in FIG. 2A.

Next, FIG. 4B is an internal block diagram of the remote controller shown in FIG. 2A. Referring to this figure, the remote controller 200 may include a wireless communication unit 420, a user input unit 430, a sensor unit 440, an output unit 450, a power supply unit 460, a memory 470, and a controller 480.

The wireless communication unit 420 can transmit and receive signals to and from any one of the content transmission devices according to the embodiments of the present invention described above. In the following, the content transmission device 100a, which is one of the content transmission devices according to the embodiments of the present invention, will be described by way of example.

In this embodiment, the wireless communication unit 420 may include an RF module 421 for transmitting and receiving signals to and from the content transmission device 100a in accordance with an RF communication standard. In addition, the wireless communication unit 420 may further include an IR module 423 for transmitting and receiving signals to and from the content transmission device 100a in accordance with an IR communication standard.

In this embodiment, the remote controller 200 can transmit a signal containing information about the motion of the remote controller 200 to the content transmission device 100a through the RF module 421. In addition, the remote controller 200 can receive a signal from the content transmission device 100a through the RF module 421. As needed, the remote controller 200 can transmit a command, such as a power on/off command, a channel change command, or a volume change command, to the content transmission device 100a through the IR module 423.

The user input unit 430 may include a keypad, a button, a touchpad, or a touchscreen. The user can input a command related to the content transmission device 100a to the remote controller 200 by manipulating the user input unit 430. When the user input unit 430 includes a hard key button, the user can input a command related to the content transmission device 100a to the remote controller 200 by pushing the hard key button. When the user input unit 430 includes a touchscreen, the user can input a command related to the content transmission device 100a to the remote controller 200 by touching a soft key on the touchscreen. In addition, the user input unit 430 may include various kinds of input tools, such as a scroll key and a jog wheel, which do not limit the scope of the present invention.

The sensor unit 440 may include a gyro sensor 441 or an acceleration sensor 443. The gyro sensor 441 can sense information about the motion of the remote controller 200. For example, the gyro sensor 441 may sense information about the motion of the remote controller 200 in x, y, and z-axis directions. The acceleration sensor 443 may sense information about the speed of movement of the remote controller 200. The sensor unit 440 may further include a distance sensor for sensing the distance between the remote controller 200 and the display device 180.

The output unit 450 may output a video or audio signal corresponding to the manipulation of the user input unit 430 or to a signal received from the content transmission device 100a. The user can recognize whether the user input unit 430 has been manipulated or whether the content transmission device 100a has been controlled, through the output unit 450.

For example, the output unit 450 may include a light emitting diode (LED) module 451 configured to be turned on when the user input unit 430 is manipulated or when a signal is received from or transmitted to the content transmission device 100a through the wireless communication module 420, a vibration module 453 for generating vibration, a sound output module 455 for outputting sound, or a display module 457 for outputting a video.

The power supply unit 460 may supply power to the remote controller 200. When the remote controller 200 remains stationary for a predetermined time, the power supply unit 460 may interrupt the supply of power to the remote controller 200 in order to reduce power consumption. The power supply unit 460 may resume the supply of power to the remote controller 200 when a predetermined key of the remote controller 200 is manipulated.

The memory 470 may store various kinds of programs and application data necessary to control or drive the remote controller 200. The remote controller 200 may wirelessly transmit and receive signals to and from the content transmission device 100*a* in a predetermined frequency band through the RF module 421. The controller 480 of the remote controller 200 may store, in the memory 470, information about the frequency band within which signals are transmitted to and received from the content transmission device 100*a*, which is paired with the remote controller 200 in a wireless fashion, and may refer to the stored information.

The controller 480 can control the overall operation of the remote controller 200. The controller 480 can transmit a signal corresponding to the manipulation of a predetermined key of the user input unit 430 or a signal corresponding to the motion of the remote controller 200 sensed by the sensor unit 440 to the content transmission device 100*a* through the wireless communication unit 420.

The user input interface unit 150 of the content transmission device 100*a* may include a wireless communication unit 411 for wirelessly transmitting and receiving signals to and from the remote controller 200 and a coordinate value calculator 415 for calculating a coordinate value of a pointer corresponding to the motion of the remote controller 200.

The user input interface unit 150 can wirelessly transmit and receive signals to and from the remote controller 200 through an RF module 412. In addition, the user input interface unit 150 can receive a signal transmitted by the remote controller 200 in accordance with an IR communication standard through an IR module 413.

The coordinate value calculator 415 can correct a hand tremor or an error in a signal corresponding to the motion of the remote controller 200, received through the wireless communication unit 411, in order to calculate coordinate values (x,y) of the pointer 205 that is to be displayed on the display device 180.

A signal from the remote controller 200, which is input to the content transmission device 100*a* through the user input interface unit 150, is transmitted to the controller 170 of the content transmission device 100*a*. The controller 170 may differentiate information about the motion and key manipulation of the remote controller 200 from the signal received from the remote controller 200, and can control the content transmission device 100*a* in response thereto.

In another example, the remote controller 200 may calculate coordinate values of the pointer corresponding to the motion thereof, and may output the calculated coordinate values to the user input interface unit 150 of the content transmission device 100*a*. In this instance, the user input interface unit 150 of the content transmission device 100*a* can transmit information about the received coordinate values of the pointer to the controller 170 without correcting a hand tremor or an error. In a further example, the coordinate value calculator 415 may be provided in the controller 170, rather than in the user input interface unit 150, unlike what is shown in this figure.

Next, FIG. 5 is an internal block diagram of the mobile terminal shown in FIG. 1. Referring to this figure, the terminal 600 may include a wireless communication unit 610, an audio/video (AN) input unit 620, a user input unit 630, a sensing unit 640, an output unit 650, a memory 660, an interface unit 625, a controller 670, and a power supply unit 690. The wireless communication unit 610 may include a broadcast reception module 611, a mobile communication module 613, a wireless Internet module 615, a sound communication unit 617, and a global positioning system (GPS) module 619.

The broadcast reception module 611 can receive a broadcast signal and/or broadcast-related information from an external broadcast management server through a broadcast channel. The broadcast channel may include a satellite channel and a terrestrial channel. The broadcast signal and/or the broadcast-related information received through the broadcast reception module 611 may be stored in the memory 660.

The mobile communication module 613 can transmit and receive a wireless signal to and from at least one selected from among a base station, an external terminal, and a server over a mobile communication network. The wireless signal may include a voice call signal, a video communication call signal, or various types of data based on text/multimedia message transmission and reception.

The wireless Internet module 615 is a module for wireless Internet access. The wireless Internet module 615 may be mounted inside or outside the mobile terminal 600. For example, the wireless Internet module 615 can perform wireless communication based on Wi-Fi or wireless communication based on Wi-Fi Direct.

The sound communication unit 617 can perform sound communication. In a sound communication mode, the sound communication unit 617 may add predetermined information data to audio data that are to be output in order to output sound. In addition, the sound communication unit 617 may extract predetermined information from an external sound in the sound communication mode. Bluetooth, radio frequency identification (RFID), infrared data association (IrDA), ultra wideband (UWB), or ZigBee may be used as short-range communication technology.

The GPS module 619 can receive position information from a plurality of artificial GPS satellites. The A/V input unit 620 may be provided for inputting an audio signal or video signal. The A/V input unit 620 may include a camera 621 and a microphone 623.

The user input unit 630 can generate key input data that are input by the user to control the operation of the terminal. Thus, the user input unit 630 may include a keypad, a dome switch, and a touchpad (static pressure or electrostatic). Particularly, when the touchpad forms a layered structure together with a display unit 680, an assembly consisting of the touchpad and the display unit 680 may be called a touchscreen.

The sensing unit 640 can sense the current state of the mobile terminal 600, such as the activated or deactivated state of the mobile terminal 600, the position of the mobile terminal 600, and whether user contact with the mobile terminal 600 has occurred, to generate a sensing signal for controlling the operation of the mobile terminal 600.

The sensing unit 640 may include a proximity sensor 641, a pressure sensor 643, and a motion sensor 645. The motion sensor 645 may sense the motion or position of the mobile terminal 600 using an acceleration sensor, a gyro sensor, a gravity sensor, or the like. In particular, the gyro sensor is a sensor for measuring the angular velocity of the mobile terminal 600. The gyro sensor may sense the angle at which the mobile terminal 600 is rotated relative to a reference direction.

The output unit 650 may include a display unit 680, an audio output unit 653, an alarm unit 655, and a haptic module 657. The display unit 680 may output information that is processed by the mobile terminal 600. For example, the display unit 680 may display information that is processed by the mobile terminal 600.

When the display unit 680 and the touchpad are disposed as a layered structure to form a touchscreen as described above, the display unit 680 may also be used as an input device that allows a user to input information via touch, in addition to an output device. The audio output unit 653 may output audio data, which are received from the wireless communication unit 610 or are stored in the memory 660. The audio output unit 653 may include a speaker and a buzzer.

The alarm unit 655 can output a signal indicating the occurrence of an event of the mobile terminal 600. For example, the alarm unit 655 can output a signal in the form of vibrations. The haptic module 657 may generate a variety of tactile effects that the user can feel. A typical example of the tactile effects generated by the haptic module 657 may be a vibration effect.

The memory 660 can store a program for processing or control of the controller 670, or may temporarily store input or output data (e.g. phonebooks, messages, still pictures, and motion pictures). The interface unit 625 can provide an interface between the mobile terminal 600 and all external devices connected to the mobile terminal 600. The interface unit 625 can receive data or power from the external devices, and transfer the received data or power to the respective components of the mobile terminal 600. In addition, data may be transmitted from the mobile terminal 600 to the external devices via the interface unit 625.

The controller 670 can control the operation of the respective components of the mobile terminal 600, thereby controlling the overall operation of the mobile terminal 600. For example, the controller 670 can perform control or processing for voice communication, data communication, and video communication. In addition, the controller 670 may further include a multimedia playback module 681 for playing back multimedia content. The multimedia playback module 681 may be incorporated into the controller 670 in the form of hardware. Alternatively, the multimedia playback module 681 may be configured separately from the controller 670 in the form of software.

The power supply unit 690 can supply external power or internal power to the respective components of the mobile terminal 600 under the control of the controller 670. The block diagram of the mobile terminal 600 shown in FIG. 5 is a view illustrating an embodiment of the present invention. Respective components of the block diagram may be combined, added, or omitted depending on the specifications of the mobile terminal 600 that is actually embodied. That is, two or more components may be combined into a single component or one component may be divided into two or more components as needed. In addition, the function performed by each block is given for description of the embodiment of the invention, and detailed actions or device pertaining thereto do not limit the scope of the invention.

Figure 6:
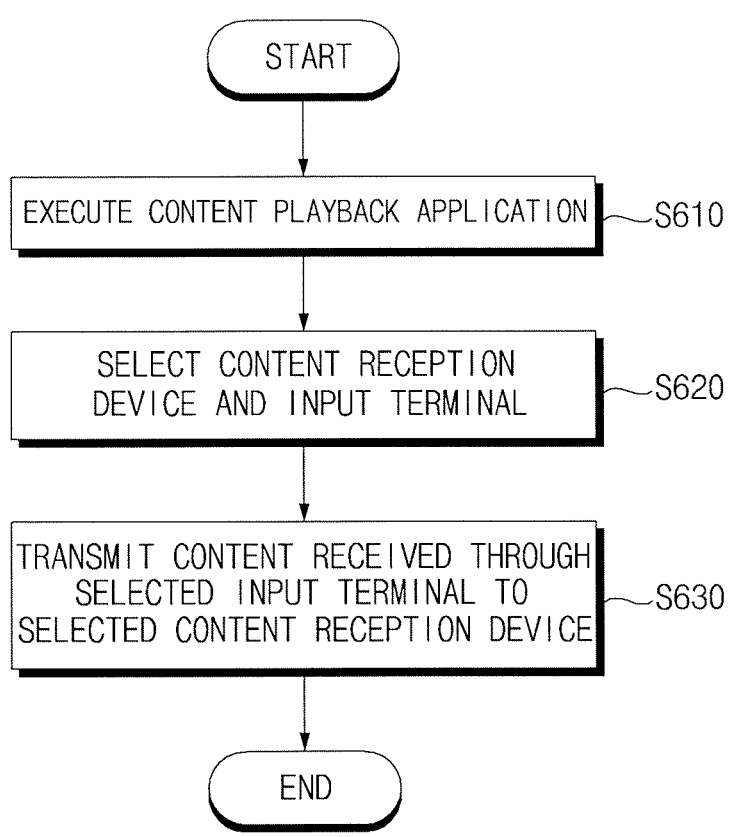
FIG. 6 is a flowchart showing an example of a method of operating a mobile terminal according to an embodiment of the present invention.

Next, FIG. 6 is a flowchart showing an example of a method of operating a mobile terminal according to an embodiment of the present invention, and FIGS. 7 to 12G are reference views illustrating the operation method of FIG. 6. Referring first to FIG. 6, the controller 670 of the mobile terminal 600 executes a content playback application in response to an input for the execution of the content playback application (S610).

Figure 8A:
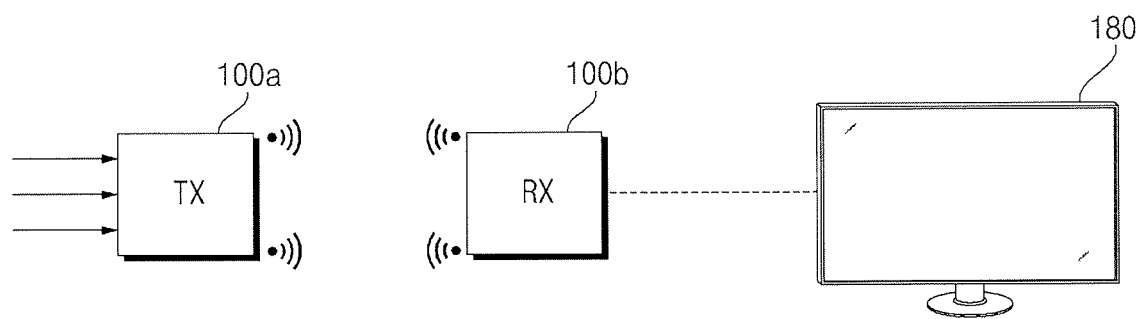
Figure 8B:
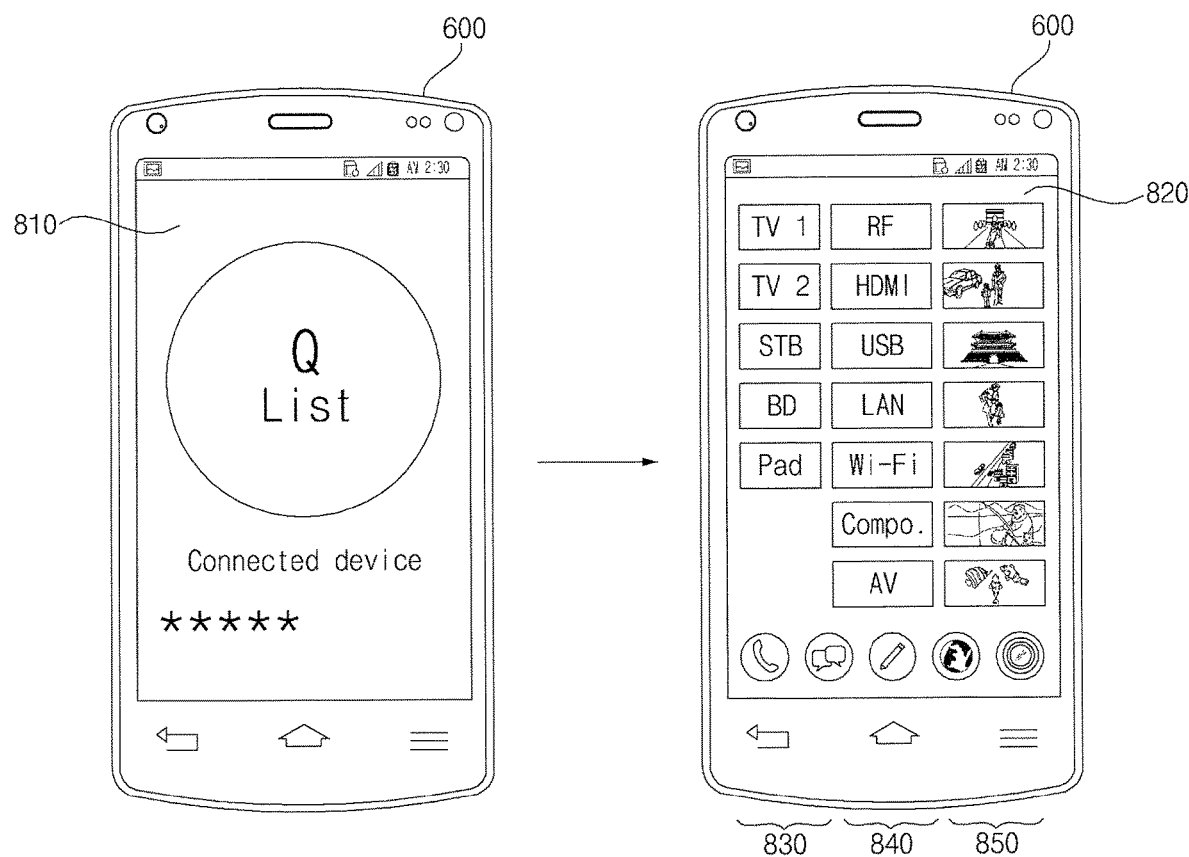

For example, when the execution of a content playback application is input and a content playback execution screen is displayed on the mobile terminal 600, as shown in FIG. 8B, the controller 670 of the mobile terminal 600 can execute the content playback application, and can display a content playback setting screen 820, as shown in FIG. 8B.

For example, when the execution of a content playback application is input and a content playback execution screen is displayed on the mobile terminal 600, as shown in FIG. 8B, the controller 670 of the mobile terminal 600 can transmit a pairing signal to the content transmission device 100*a* through the communication unit 610.

Subsequently, the controller 670 of the mobile terminal 600 can receive a pairing response signal from the content transmission device 100*a* through the communication unit 610. Consequently, the controller 670 of the mobile terminal 600 can perform a control operation to achieve pairing between the mobile terminal 600 and the content transmission device 100*a*.

The pairing signal, the pairing response signal, and the signals that are transmitted and received between the mobile terminal 600 and the content transmission device 100*a* after pairing may be RF signals. After pairing has been completed, the controller 670 of the mobile terminal 600 can display a content playback setting screen 820, including an item related to the at least one content reception device, an item related to at least one of the input terminals through which the at least one content reception device is connected to the content transmission device 100*a*, and a thumbnail image corresponding to the item related to the at least one of the input terminals, in response to the input for the execution of the content playback application.

As shown in FIG. 8B, the content playback setting screen 820 may include items related to a plurality of content reception devices, such as TV1, TV2, STB (a set-top box), BD (a Blu-ray player), and Pad (a tablet device). As shown in FIG. 8B, the content playback setting screen 820 may also include items related to a plurality of input terminals, such as RF (corresponding to an antenna terminal), HDMI, USB, LAN (a wired communication terminal), Wi-Fi (a wireless communication terminal), Composite, and AV, which are provided in the content transmission device 100*a*.

Further, as shown in FIG. 8B, the content playback setting screen 820 may include thumbnail images corresponding to RF, HDMI, USB, LAN, Wi-Fi, Composite, and AV. That is, the content playback setting screen 820 may include thumbnail images of content data that are input through the terminals, such as RF, HDMI, USB, LAN, Wi-Fi, Composite, and AV.

The controller 670 of the mobile terminal 600 can select a content reception device and an input terminal in response to an input for selecting the content reception device and an input for selecting the input terminal (S620). Subsequently, the controller 670 of the mobile terminal 600 can transmit content data received through the selected input terminal to the selected content reception device (S630).

When the content playback setting screen 820 is displayed, the controller 670 of the mobile terminal 600 can select an item related to a first content reception device from among the items related to the content reception devices in the content playback setting screen 820, and select an item related to a first input terminal from among the items related to the input terminals in the content playback setting screen 820, in response to a user's touch input.

When the item related to the first content reception device has been selected from among the items related to the content reception devices in the content playback setting screen 820 and the item related to the first input terminal has been selected from among the items related to the input terminals in the content playback setting screen 820, the controller 670 of the mobile terminal 600 can transmit the selected information to the content transmission device 100*a*.

As a result, the content transmission device 100*a* can wirelessly transmit content data, received through the first input terminal, to the first content reception device based on the information about the selection of the first content reception device and the information about the selection of the first input terminal, received from the mobile terminal 600. When transmitting the content data, the content transmission device 100*a* may use a specific frequency band, which is set based on the operation shown in FIG. 7.

Figure 7:
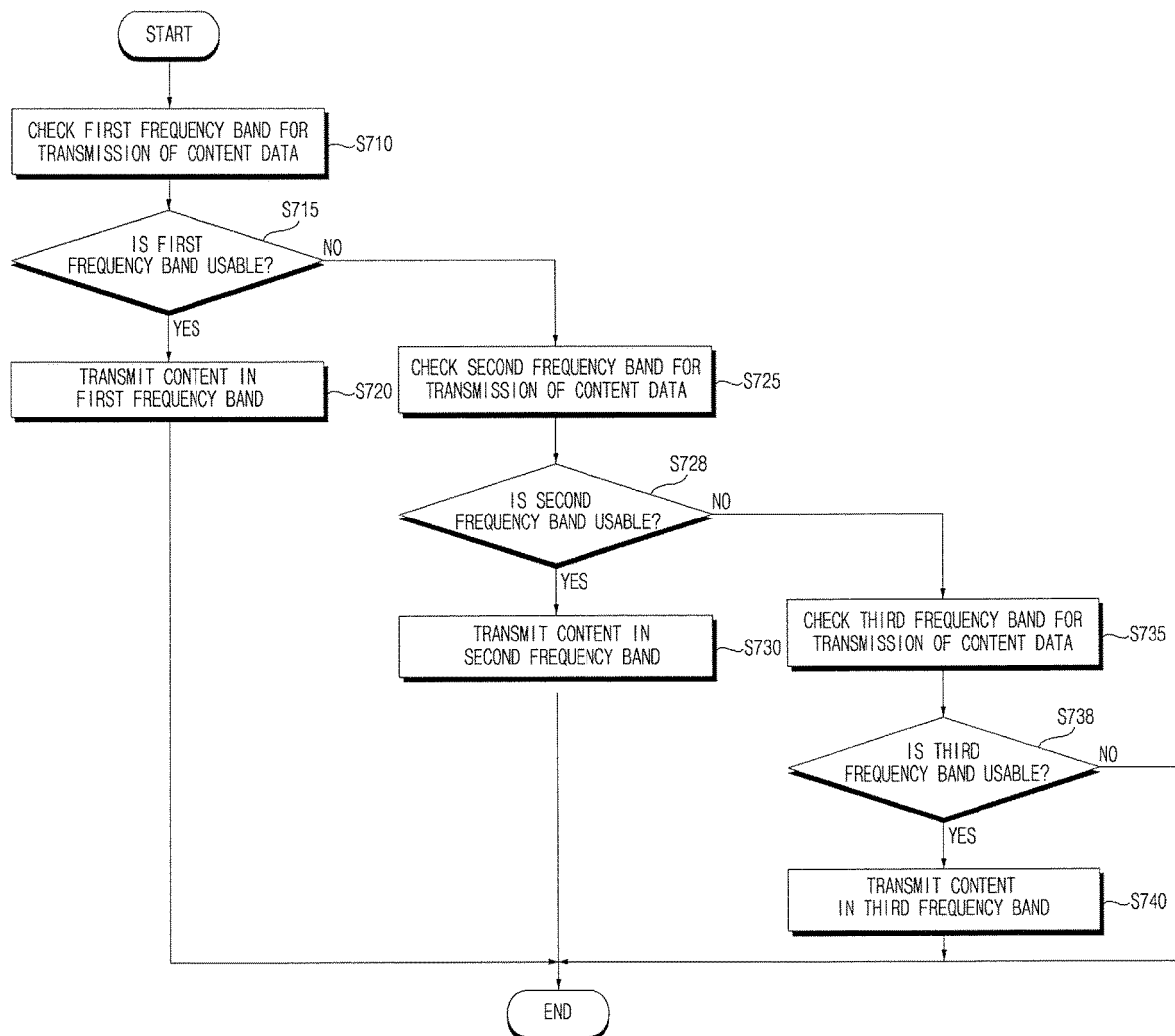
FIGS. 7 to 12G are reference views illustrating the operation method of FIG. 6.

Next, FIG. 7 is a flowchart showing a method of operating the content transmission device 100*a*. Referring to this figure, the controller 170 of the content transmission device 100*a* can transmit a pairing signal to the first content reception device 100*ba* through the communication unit 135, and can receive a pairing response signal from the first content reception device 100*ba* through the communication unit 135.

As a result, the controller 170 of the content transmission device 100*a* can perform pairing between the content transmission device 100*a* and the first content reception device 100*ba*. After pairing has been completed, the controller 170 of the content transmission device 100*a* can check a first frequency band for the transmission of content data (S710).

The first frequency band may be a frequency band of 2.4 GHz for Wi-Fi communication. For example, the controller 170 of the content transmission device 100*a* can transmit a reference signal of the first frequency band to the first content reception device 100*ba*, and can receive a response signal from the first content reception device 100*ba*.

The controller 170 of the content transmission device 100*a* can compare the response signal with the reference signal in order to check a data transfer rate, the state of the frequency band, etc. The controller 170 of the content transmission device 100*a* can determine whether the first frequency band is usable by checking the frequency band (S715). Upon determining that the first frequency band is usable, the controller 170 of the content transmission device 100*a* can transmit content data to the first content reception device 100*ba* in the first frequency band (S720).

When the content data are stably transmitted to the first content reception device 100*ba* in the first frequency band, the controller 170 of the content transmission device 100*a* can transmit information about the transmission in the first frequency band to the mobile terminal 600. Consequently, when the transmission is being performed in the first frequency band, as shown in FIG. 8H, the controller 670 of the mobile terminal 600 can display a first object 888 indicating that the transmission is being performed in the first frequency band.

Upon determining at step S715 that the first frequency band is not usable, step S725 is performed. That is, the controller 170 of the content transmission device 100*a* can check a second frequency band for the transmission of content data (S725). The second frequency band may be a frequency band of 5 GHz for Wi-Fi communication. For example, the controller 170 of the content transmission device 100*a* can transmit a reference signal of the second frequency band to the first content reception device 100*ba*, and can receive a response signal from the first content reception device 100*ba*.

The controller 170 of the content transmission device 100*a* can compare the response signal with the reference signal in order to check a data transfer rate, the state of the frequency band, etc. The controller 170 of the content transmission device 100*a* can determine whether the second frequency band is usable by checking the frequency band (S728). Upon determining that the second frequency band is usable, the controller 170 of the content transmission device 100*a* can transmit content data to the first content reception device 100*ba* in the second frequency band (S730).

When the content data are stably transmitted to the first content reception device 100*ba* in the second frequency band, the controller 170 of the content transmission device 100*a* can transmit information about the transmission in the second frequency band to the mobile terminal 600. Consequently, when the transmission is being performed in the second frequency band, as shown in FIG. 8I, the controller 670 of the mobile terminal 600 can display a second object 889 indicating that the transmission is being performed in the second frequency band.

Upon determining at step S728 that the second frequency band is not usable, step S735 is performed. That is, the controller 170 of the content transmission device 100*a* can check a third frequency band for the transmission of content data (S735). The third frequency band may be a frequency band of 50 GHz for WiGig or WiHD communication.

For example, the controller 170 of the content transmission device 100*a* can transmit a reference signal of the third frequency band to the first content reception device 100*ba*, and can receive a response signal from the first content reception device 100*ba*. The controller 170 of the content transmission device 100*a* can compare the response signal with the reference signal in order to check a data transfer rate, the state of the frequency band, etc.

The controller 170 of the content transmission device 100*a* can determine whether the third frequency band is usable by checking the frequency band (S738). Upon determining that the third frequency band is usable, the controller 170 of the content transmission device 100*a* can transmit content data to the first content reception device 100*ba* in the third frequency band (S740). When the content data are stably transmitted to the first content reception device 100*ba* in the third frequency band, the controller 170 of the content transmission device 100*a* can transmit information about the transmission in the third frequency band to the mobile terminal 600.

Figure 8C:
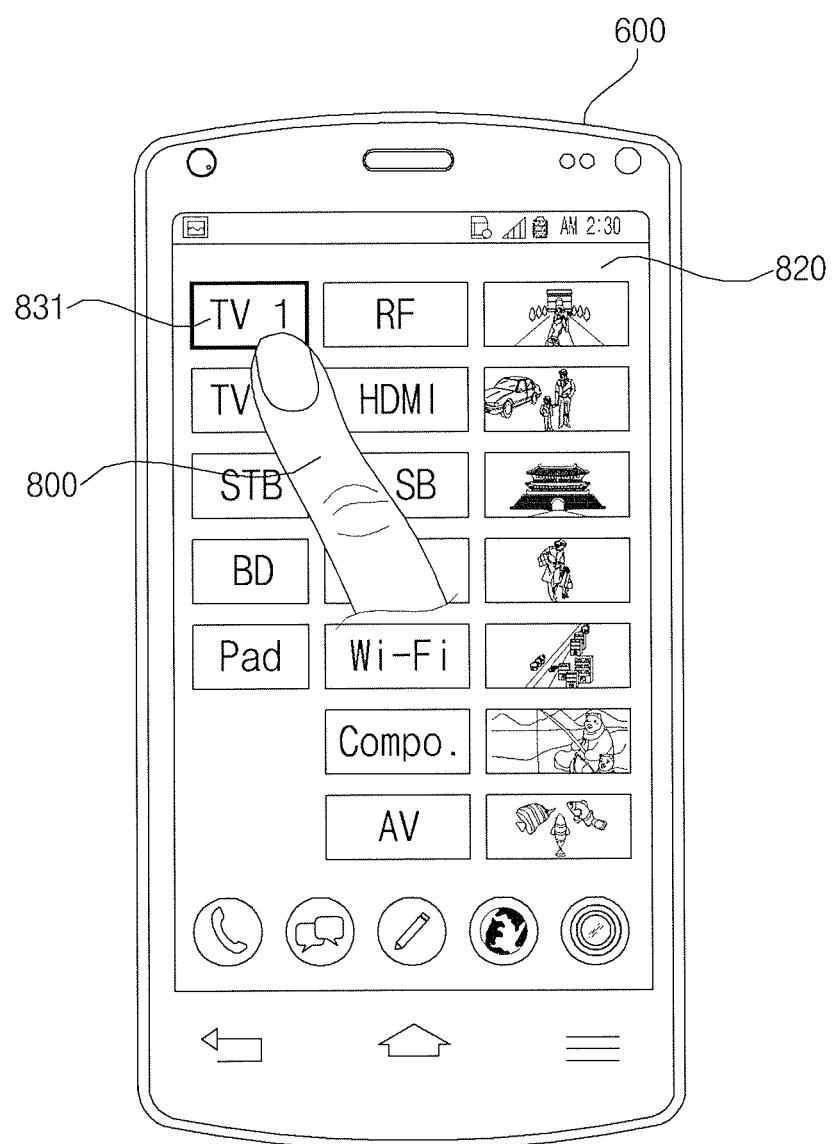
Figure 8D:
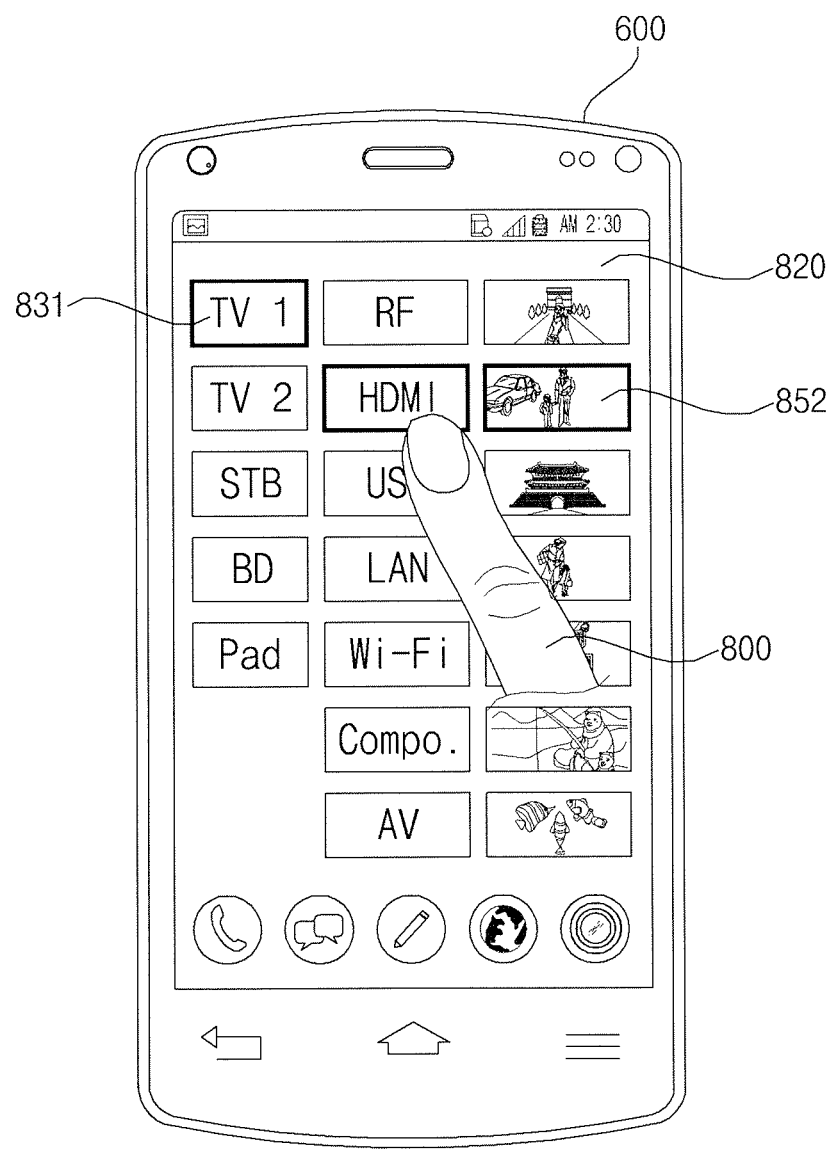
Figure 8E:
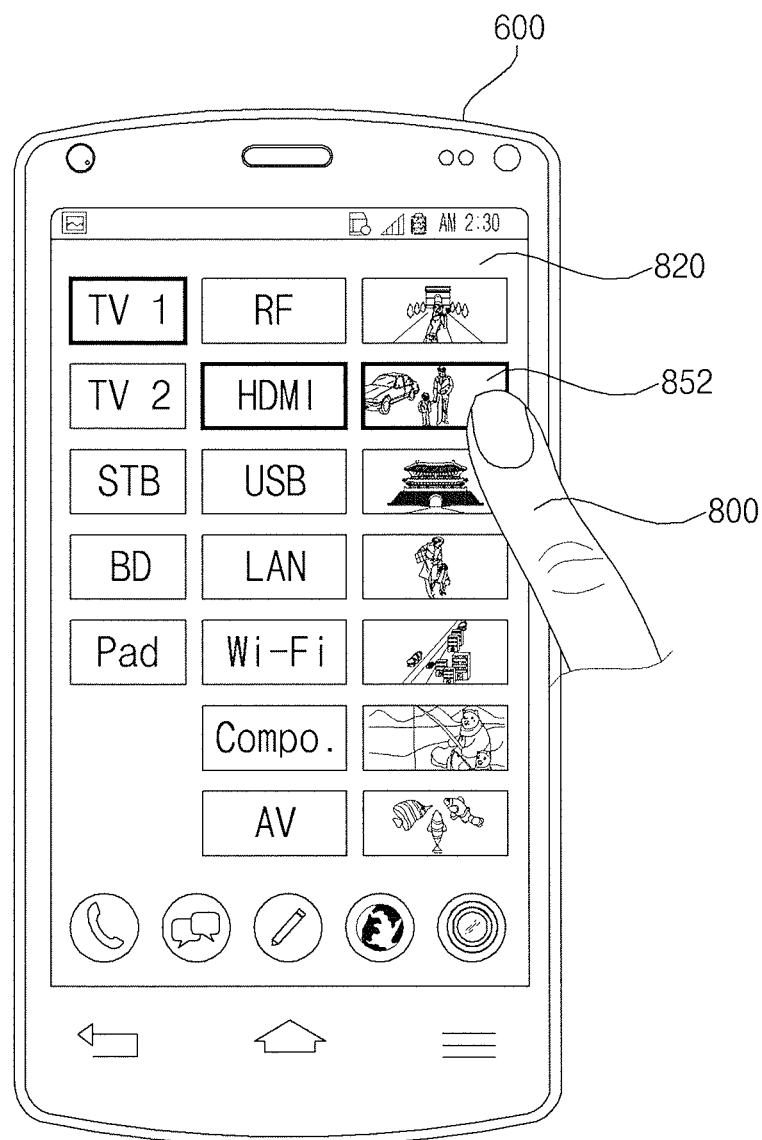
Figure 8F:
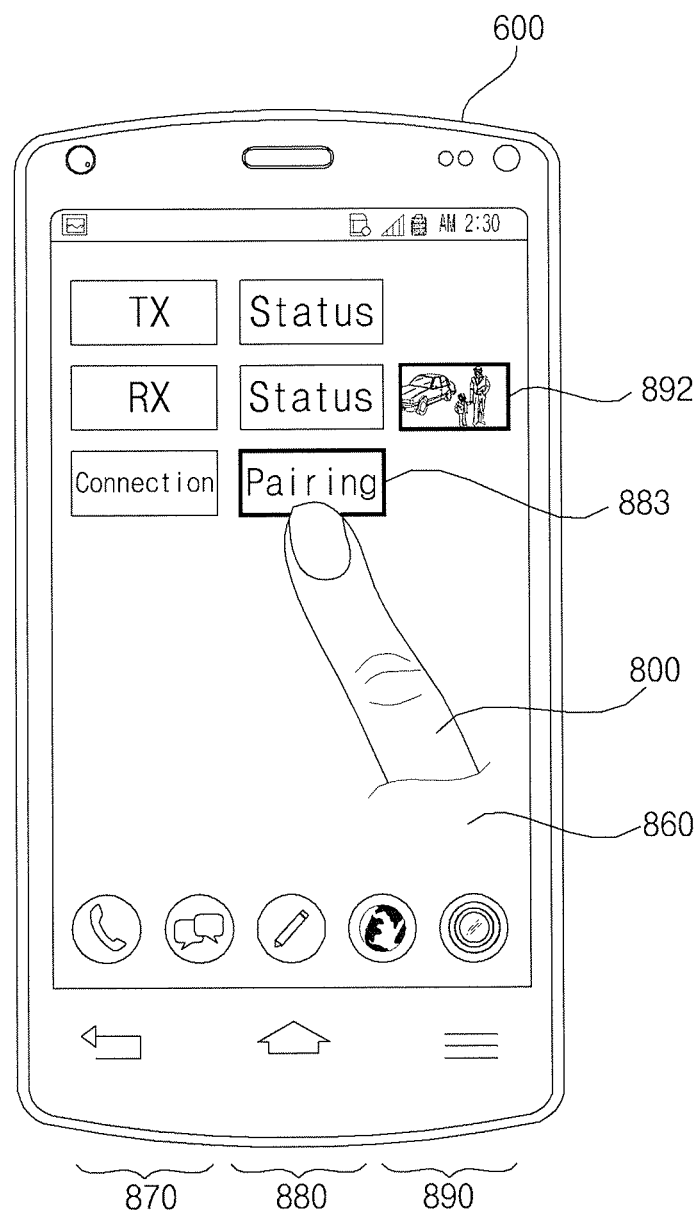
Figure 8G:
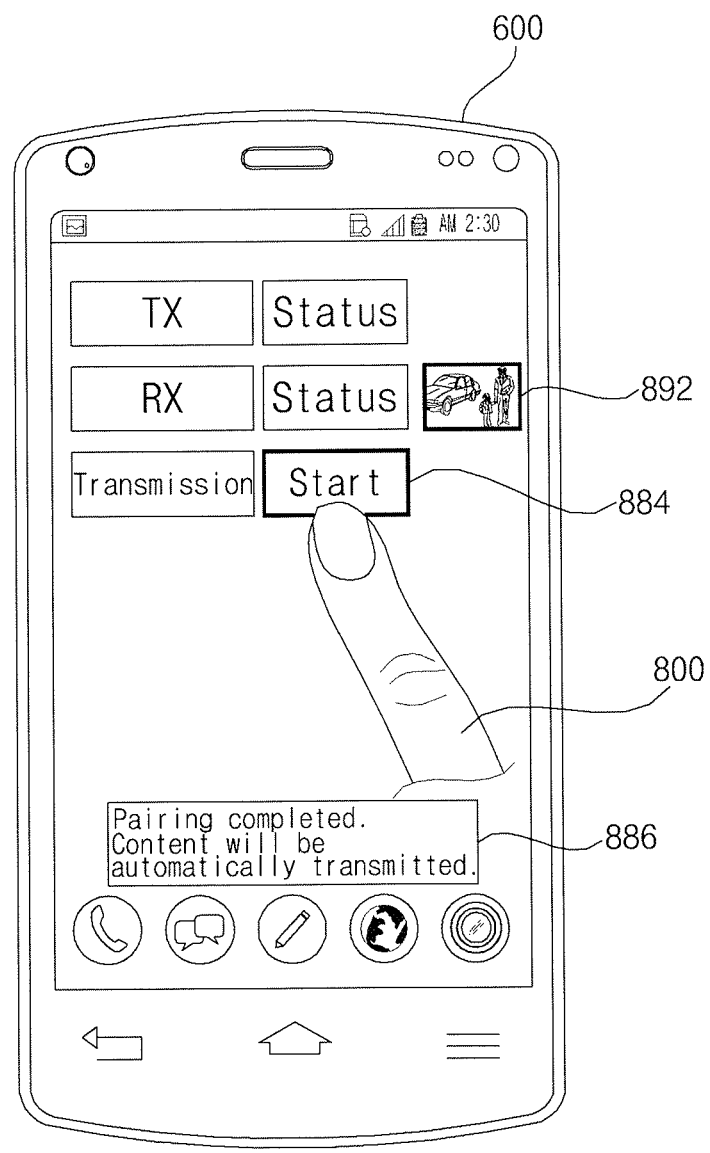
Figure 8H:
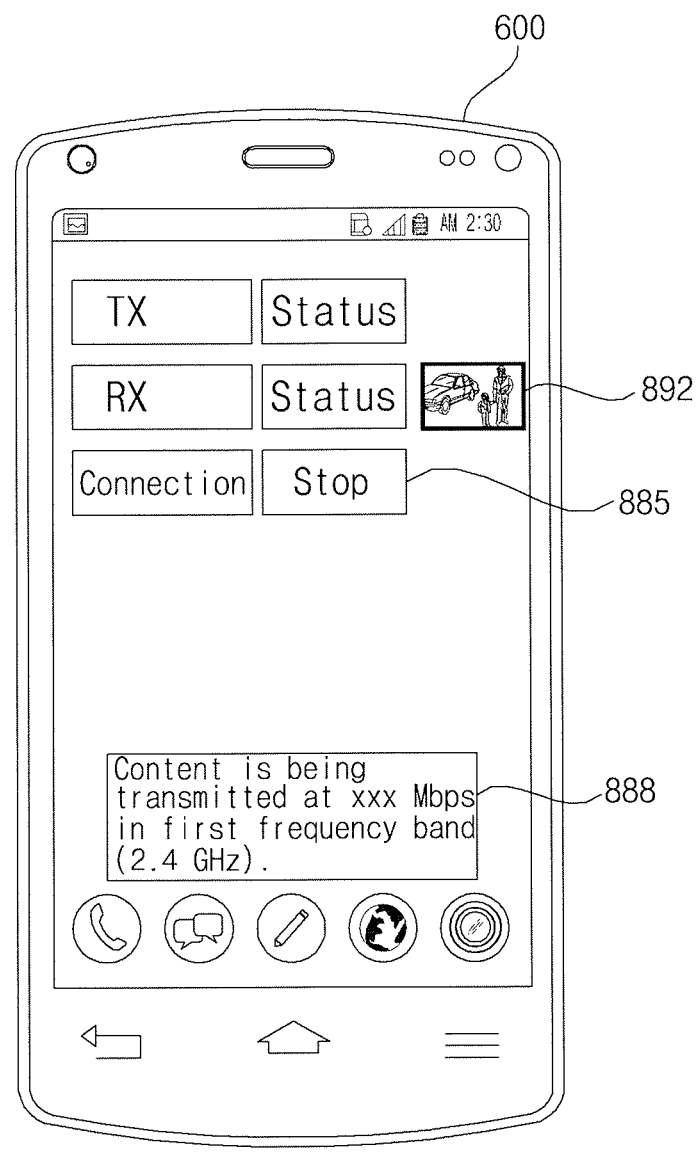
Figure 8I:
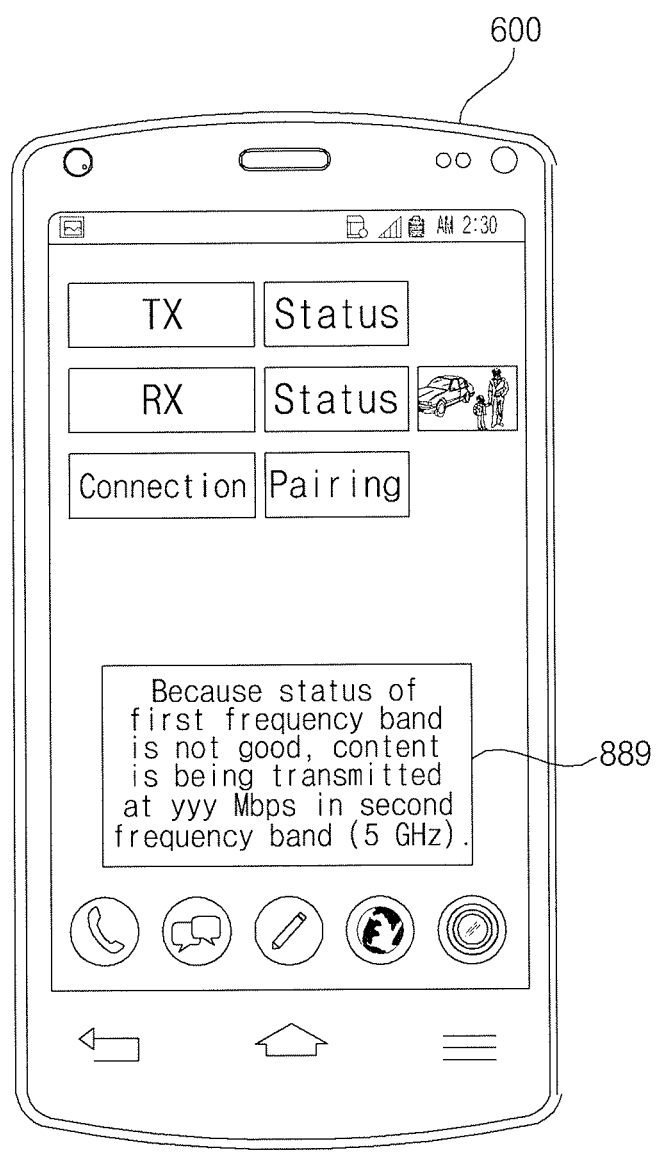
Figure 8J:
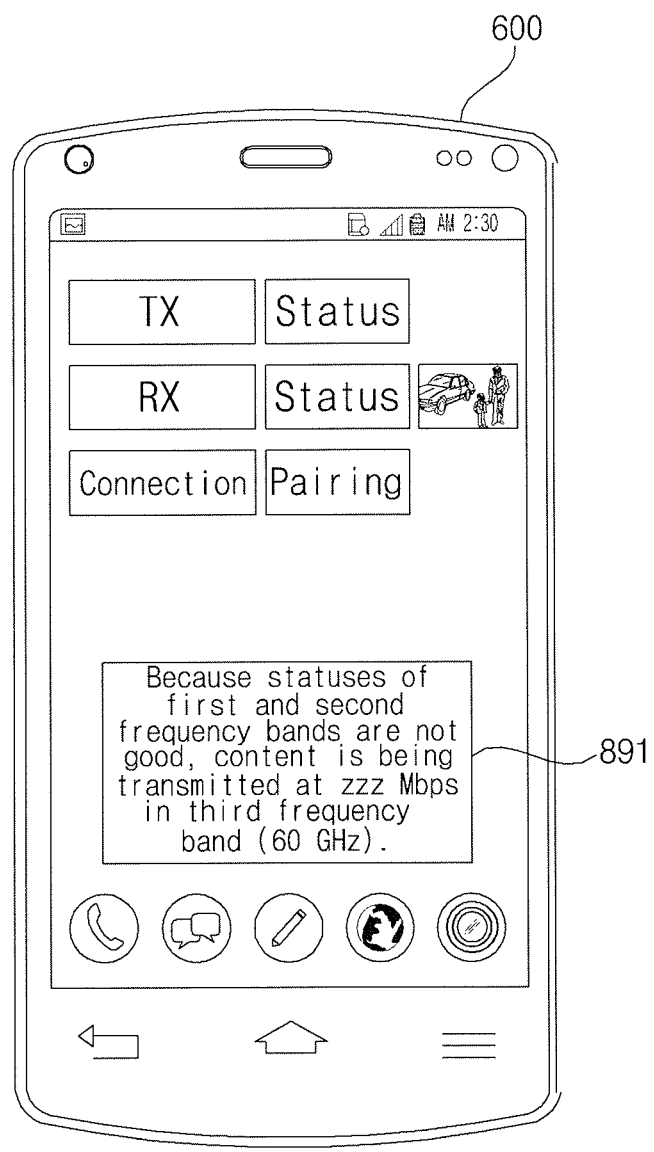
Figure 8K:
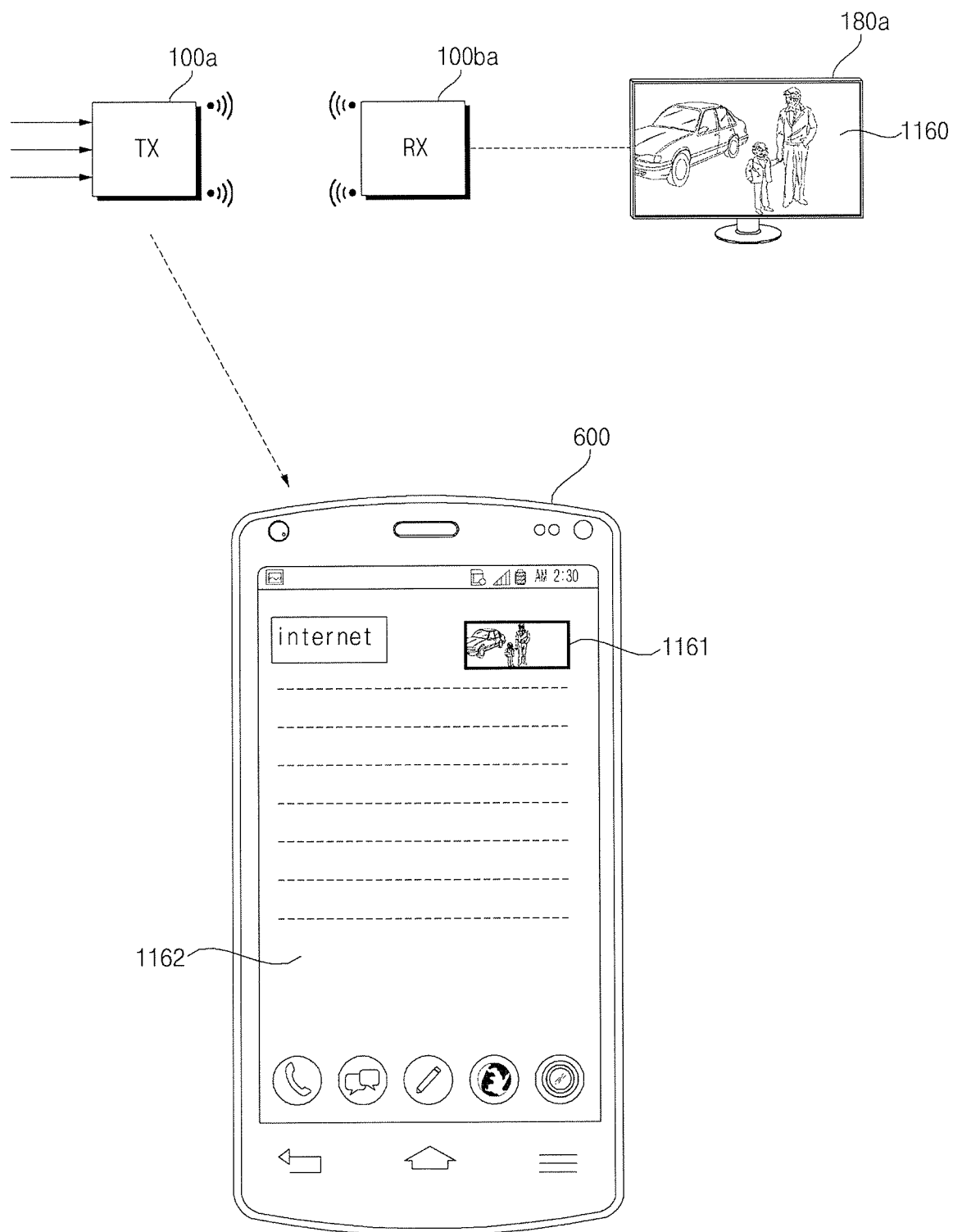

Consequently, when the transmission is being performed in the third frequency band, as shown in FIG. 8J, the controller 670 of the mobile terminal 600 can display a third object 891 indicating that the transmission is being performed in the third frequency band.

Since three frequency bands are used, as described above, content data may be stably transmitted from the content transmission device 100*a* to the first content reception device 100*ba*. Also, since three frequency bands are used, the video display system based on the wireless transmission of content data shown in FIG. 1 may be named a three-band system.

Next, FIG. 8A shows a video display system 10 based on the wireless transmission of content data as shown in FIG. 1. In an embodiment of the present invention, the mobile terminal 600 can select an input terminal of the content transmission device 100*a* and a content reception device.

The mobile terminal 600 can select one of the content reception devices 100*ba*, 100*bb*, . . . , and select one of the input terminals provided in the content transmission device 100*a*. When the execution of a content playback application is input and a content playback execution screen is displayed on the mobile terminal 600, as shown in FIG. 8B, the controller 670 of the mobile terminal 600 can execute the content playback application, and can display a content playback setting screen 820, as shown in FIG. 8B.

As shown in FIG. 8B, the content playback setting screen 820 may include items related to a plurality of content reception devices, such as TV1, TV2, STB (a set-top box), BD (a Blu-ray player), and Pad (a tablet device). As shown in FIG. 8B, the content playback setting screen 820 may also include items related to a plurality of input terminals, such as RF (corresponding to an antenna terminal), HDMI, USB, LAN (a wired communication terminal), Wi-Fi (a wireless communication terminal), Composite, and AV, which are provided in the content transmission device 100*a*. As shown in FIG. 8B, the content playback setting screen 820 may include thumbnail images corresponding to RF, HDMI, USB, LAN, Wi-Fi, Composite, and AV. That is, the content playback setting screen 820 may include thumbnail images of content data that are input through the terminals, such as RF, HDMI, USB, LAN, Wi-Fi, Composite, and AV.

FIG. 8C shows when a TV1 item 831 in the content playback setting screen 820 is selected by a finger 800 of the user. That is, FIG. 8C shows when a first content reception device 100*ba* is selected from a plurality of content reception devices. In addition, FIG. 8D shows when an HDMI item in the content playback setting screen 820 is selected by the finger 800 of the user. That is, FIG. 8D shows when an HDMI terminal is selected as an input terminal.

The controller 670 of the mobile terminal 600 can display a thumbnail image 852 corresponding to content data input through the HDMI terminal in a highlighted state, as shown in FIG. 8D, in response to the selection of the HDMI item.

In addition, FIG. 8E shows when the thumbnail image 852 corresponding to the HDMI item in the content playback setting screen 820 is selected by the finger 800 of the user. As a result, the controller 670 of the mobile terminal 600 can transmit information about the selection of the first content reception device 100*ba* corresponding to the TV1 item 831 and information about the selection of the HDMI terminal of the content transmission device 100*a* to the content transmission device 100*a*.

The controller 170 of the content transmission device 100*a* can transmit content data input through the HDMI terminal of the content transmission device 100*a* to the first content reception device 100*ba*, which corresponds to the TV1 item 831 based on the information received from the mobile terminal 600.

When the thumbnail image 852 corresponding to the HDMI item in the content playback setting screen 820 is selected by the finger 800 of the user in FIG. 8E, the controller 670 of the mobile terminal 600 can display a screen 860 for wireless pairing, as shown in FIG. 8F.

That is, the controller 670 of the mobile terminal 600 can display a screen 860 for wireless pairing between the content transmission device 100*a* and the first content reception device 100*ba* in response to the selection of the first content reception device 100*ba* from among the at least one content reception device 100*b* and the selection of the first input terminal from among the input terminals.

The screen 860 for wireless pairing may include an item related to the status of the transmission device, an item related to the status of the reception device, a thumbnail image 892 corresponding to content data to be transmitted, and a pairing item 883.

FIG. 8F shows when the pairing item 883 in the screen 860 for wireless pairing is selected by the finger 800 of the user. Consequently, the controller 670 of the mobile terminal 600 can transmit a control signal for performing pairing between the content transmission device 100*a* and the first content reception device 100*ba* to the content transmission device 100*a*.

The controller 170 of the content transmission device 100*a* can receive the control signal from the mobile terminal, and can perform pairing between the content transmission device 100*a* and the first content reception device 100*ba* based on the received control signal.

As described above, the controller 170 of the content transmission device 100*a* can transmit a pairing signal to the first content reception device 100*ba*, and can perform pairing based on a pairing response signal received from the first content reception device 100*ba*.

The controller 170 of the content transmission device 100*a* can transmit a pairing completion signal to the mobile terminal 600 after pairing has been completed. When wireless pairing between the content transmission device 100*a* and the first content reception device 100*ba* has been completed, the controller 670 of the mobile terminal 600 can display a transmission start object 886 for the transmission of content data, as shown in FIG. 8G.

Alternatively, when wireless pairing between the content transmission device 100*a* and the first content reception device 100*ba* has been completed, the controller 670 of the mobile terminal 600 can perform a control operation to switch the pairing item shown in FIG. 8F to a start item 884 and then to display the start item 884. When the start item 884 is selected by the finger 800 of the user, as shown in FIG. 8G, the controller 670 of the mobile terminal 600 can transmit a data transmission start signal to the content transmission device 100*a*.

The controller 170 of the content transmission device 100*a* can transmit content data input through the HDMI terminal of the content transmission device 100*a* to the first content reception device 100*ba* based on the data transmission start signal from the mobile terminal 600. As a result, content data desired by the user can be transmitted, thereby improving user convenience.

When the content data are stably transmitted to the first content reception device 100*ba* in a first frequency band, the controller 170 of the content transmission device 100*a* can transmit information about the transmission in the first frequency band to the mobile terminal 600. Consequently, when the transmission is being performed in the first frequency band, as shown in FIG. 8H, the controller 670 of the mobile terminal 600 can display a first object 888 indicating that the transmission is being performed in the first frequency band.

When the content data are stably transmitted to the first content reception device 100*ba* in a second frequency band, the controller 170 of the content transmission device 100*a* can transmit information about the transmission in the second frequency band to the mobile terminal 600. Consequently, when the transmission is being performed in the second frequency band, as shown in FIG. 8I, the controller 670 of the mobile terminal 600 can display a second object 889, indicating that the transmission is being performed in the second frequency band.

When the content data are stably transmitted to the first content reception device 100*ba* in a third frequency band, the controller 170 of the content transmission device 100*a* can transmit information about the transmission in the third frequency band to the mobile terminal 600. Consequently, when the transmission is being performed in the third frequency band, as shown in FIG. 8J, the controller 670 of the mobile terminal 600 can display a third object 891, indicating that the transmission is being performed in the third frequency band. As a result, the user can easily recognize the frequency band in which the transmission is being performed.

The controller 170 of the content transmission device 100*a* can transmit information about the content data that are being transmitted to the mobile terminal 600. In addition, the controller 670 of the mobile terminal 600 can receive the content data, and can display the received content data in a portion of the screen.

Specifically, the controller 670 of the mobile terminal 600 can display a thumbnail image 1161 corresponding to the content data that are being transmitted on another screen, e.g. an Internet screen 1162, in an overlaying fashion. The controller 670 of the mobile terminal 600 can transmit information set based on a setting input of at least one selected from among the image size, playback time, fast-forward, and volume of a video based on the displayed content data to the content transmission device 100*a*.

Figure 8L:
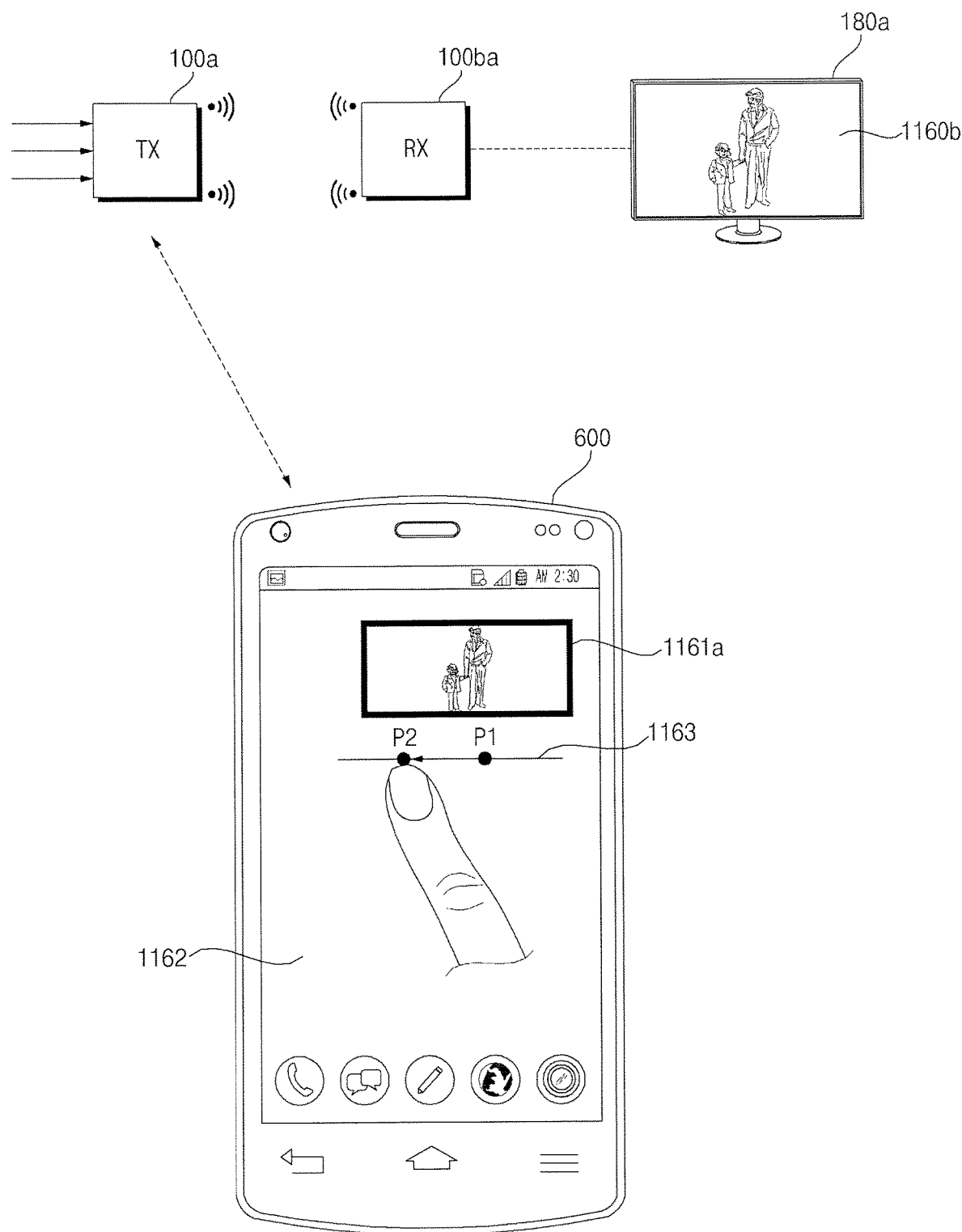

Next, FIG. 8L shows when the thumbnail image 1161 is selected by the finger 800 of the user. When the thumbnail image 1161 is selected by the finger 800 of the user, the controller 670 of the mobile terminal 600 can display a playback time setting object 1163 in addition to the display of an enlarged thumbnail image 1161*a*, as shown in FIG. 8I.

When the current time P1 is not selected but the previous time P2 is selected in the playback time setting object 1163 by the finger 800 of the user, the controller 670 of the mobile terminal 600 can transmit information about the previous time P2 to the content transmission device 100*a*.

The controller 170 of the content transmission device 100*a* can perform a control operation to content data from the changed playback time are transmitted to the first content reception device 100*ba* based on information about the changed playback time from the mobile terminal 600. Consequently, the user can directly view the content data from a desired time.

When the playback time is changed, the controller 170 of the content transmission device 100*a* can transmit corresponding content data to the mobile terminal 600. As a result, the controller 670 of the mobile terminal 600 can display a thumbnail image corresponding to the content data, the playback time of which has been changed. The controller 670 of the mobile terminal 600 can sequentially display thumbnail images corresponding to the items related to the input terminals in the content playback setting screen 820 based on thumbnail images that are sequentially received from the content transmission device 100*a*.

Figure 9A:
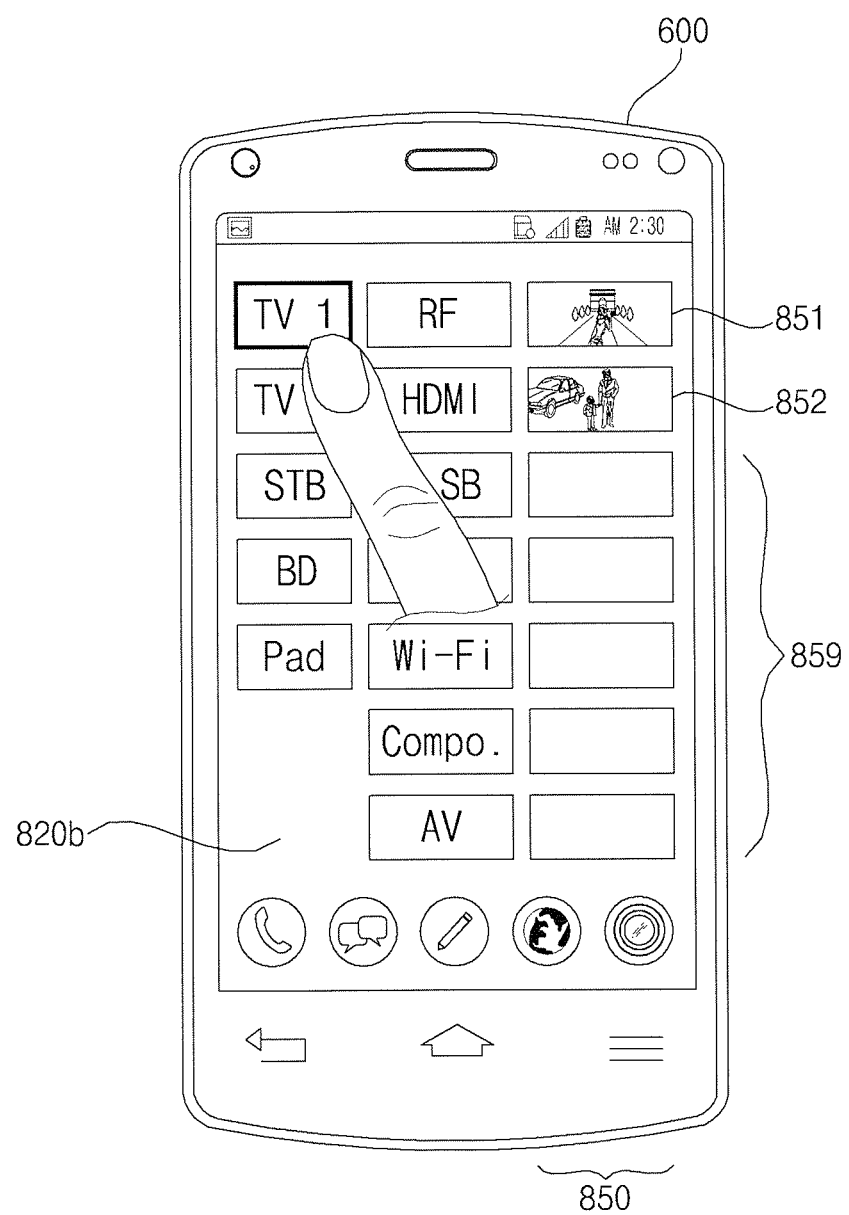
Figure 9B:
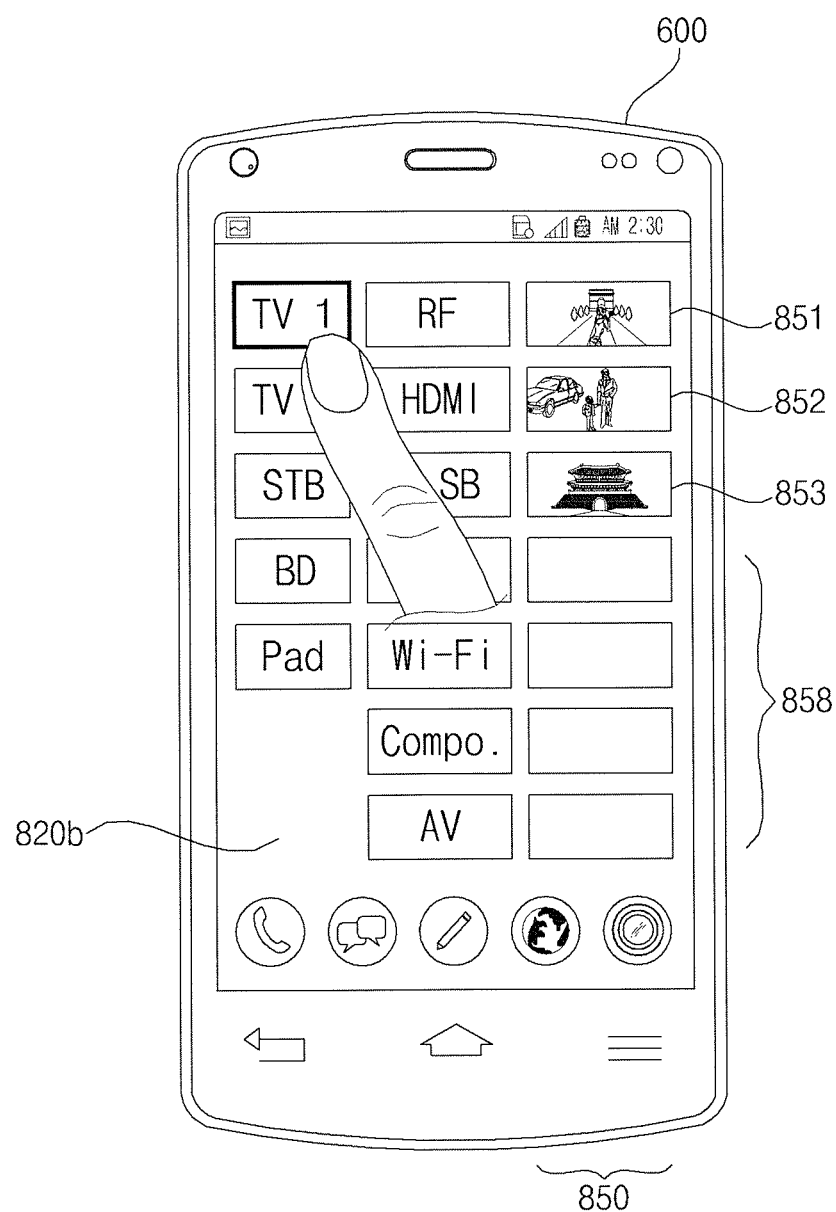

Next, FIG. 9A shows when only two thumbnail images 851 and 852 are displayed in a content playback setting screen 820*b* at the time T1 and other thumbnail images 859 are not displayed, and FIG. 9B shows when only three thumbnail images 851, 852, and 853 are displayed in a content playback setting screen 820*b* at the time T2 and other thumbnail images 858 are not displayed.

The controller 670 of the mobile terminal 600 can display thumbnail images corresponding to items related to input terminals in the content playback setting screen 820 when the number of the thumbnail images is changed based on the item related to the content reception device 100*b* that is selected.

Figure 10A:
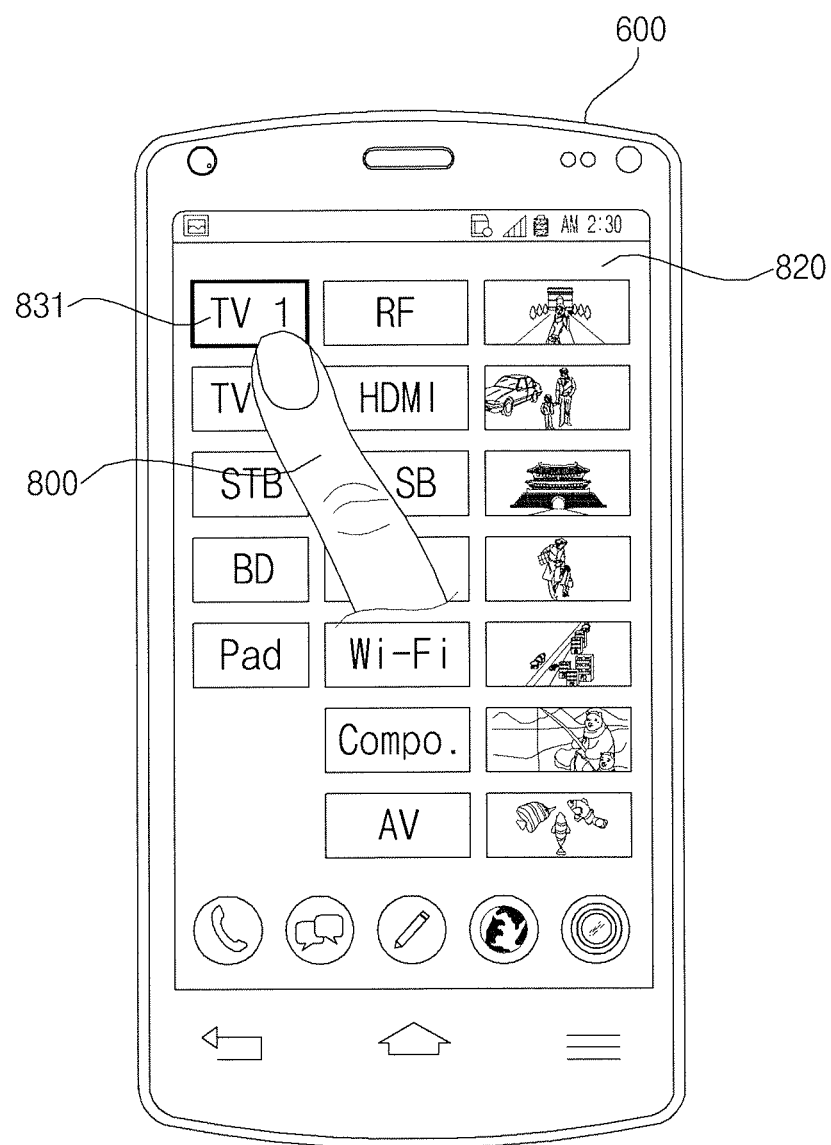
Figure 10B:
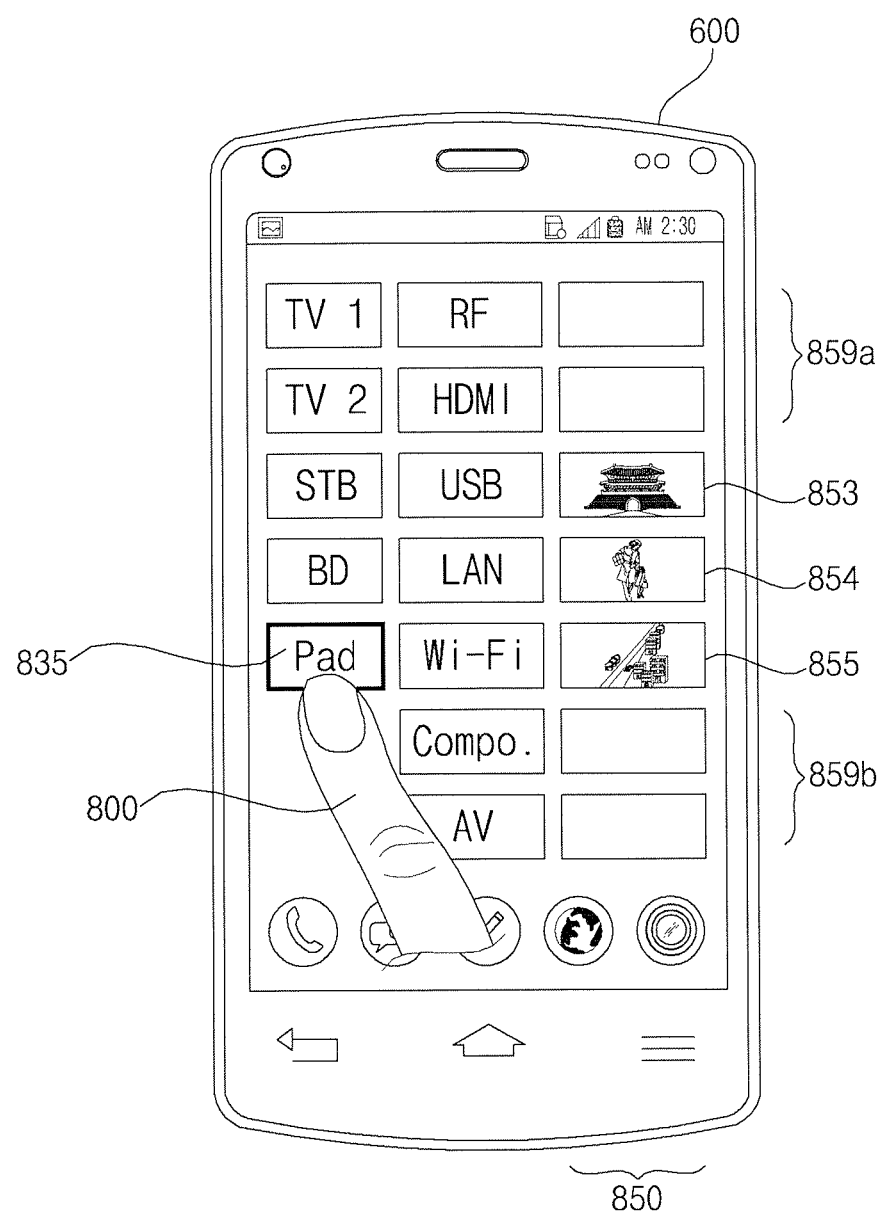

FIG. 10A shows when a TV1 item 831 is selected in the content playback setting screen 820, with the result that the number of thumbnail images corresponding to input terminals through which content data can be transmitted is 7, and FIG. 10B shows when a Pad item 835 is selected in the content playback setting screen 820, with the result that the number of thumbnail images corresponding to input terminals through which content data can be transmitted is 3.

The controller 170 of the content transmission device 100*a* can receive information about the selected content reception device from the mobile terminal 600, and recognize input terminals through which content data can be transmitted based on the information about the selected content reception device. When the TV1 item is selected, as shown in FIG. 10A, the controller 170 of the content transmission device 100*a* can transmit information indicating that all input terminals are usable or thumbnail images corresponding to the usable input terminals to the mobile terminal 600, since all content data can be received and displayed for TV. In addition, the controller 670 of the mobile terminal 600 can perform a control operation to the thumbnail images are activated and displayed, as shown in FIG. 10A.

When the Pad item is selected, as shown in FIG. 10B, the controller 170 of the content transmission device 100*a* can transmit information indicating that some input terminals are usable or thumbnail images corresponding to the usable input terminals to the mobile terminal 600, since some content data can be received and displayed on Pad (a tablet device). In addition, the controller 670 of the mobile terminal 600 can perform a control operation to the thumbnail images are activated and displayed, as shown in FIG. 10B.

Figure 11A:
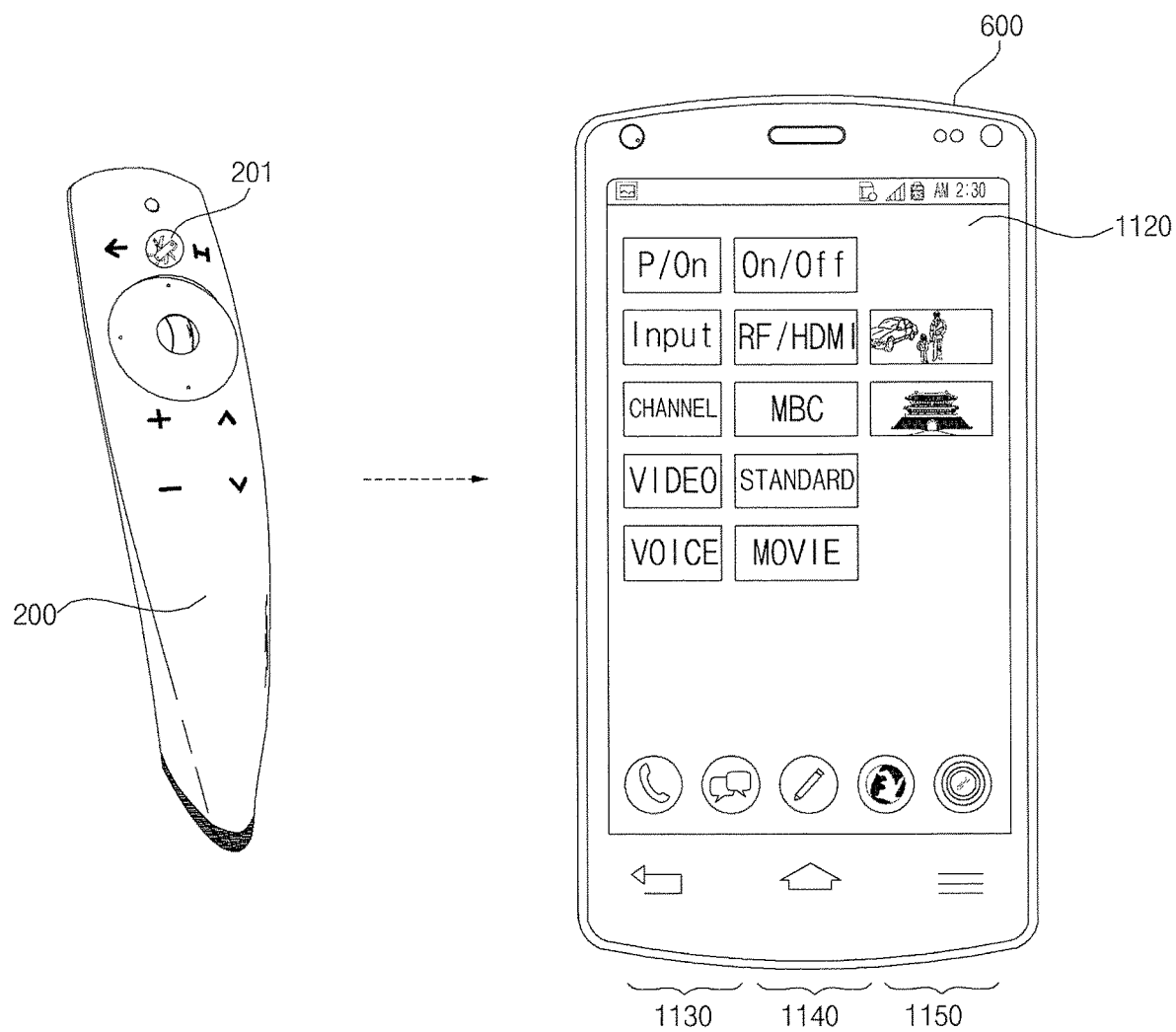

Next, FIG. 11A shows when information about an input for the execution of a content playback application is transmitted to the mobile terminal 600 when a specific key 201 of the remote controller 200 is operated. As the result of the input for the execution of the content playback application, as shown in this figure, a content playback setting screen 1120 can be displayed on the mobile terminal 600. That is, the controller 670 of the mobile terminal 600 can display a content playback setting screen 1120, including a power on item, a power off item, an input item, and a thumbnail image corresponding to the input item, in response to the input for the execution of the content playback application, as shown in FIG. 11A.

The controller 670 of the mobile terminal 600 can transmit content data received through the first input terminal of the content transmission device 100*a* to the content reception device 100*b* based on the selection of the first input terminal as the input item. As shown in FIG. 11A, the content playback setting screen 1120 may further include a channel setting item, a video setting item, and an audio setting item.

Figure 11B:
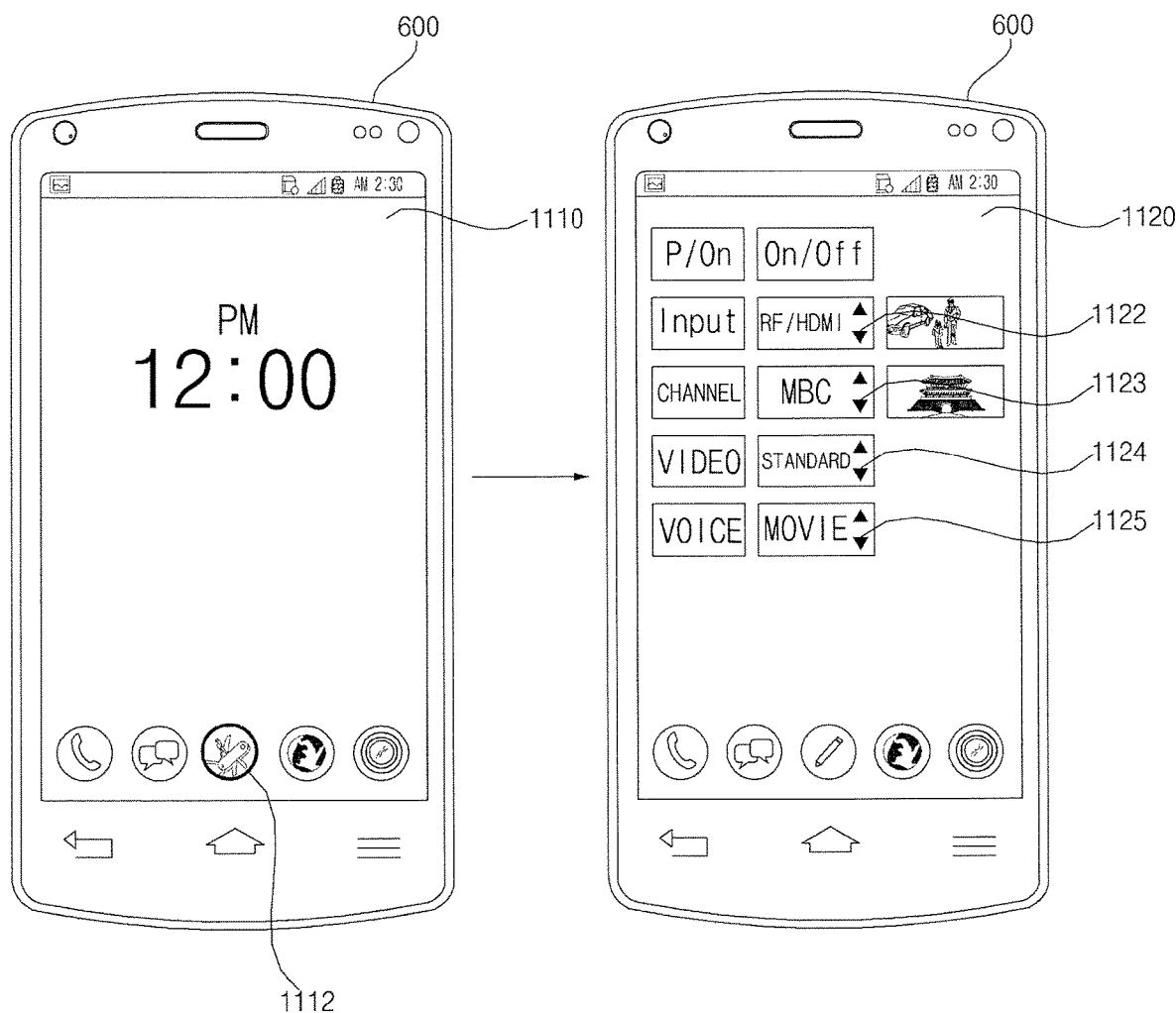

Next, FIG. 11B shows when information about an input for the execution of a content playback application is transmitted to the mobile terminal 600 when a specific application item 1112 is selected on the mobile terminal 600. As the result of the input for the execution of the content playback application, the controller 670 of the mobile terminal 600 can display a content playback setting screen 1120, including a power on item, a power off item, an input item, and a thumbnail image corresponding to the input item, in response to the input for the execution of the content playback application, as shown in FIG. 11B.

In addition, control items 1122, 1123, 1125, and 1126 may be further provided for the input item, the channel setting item, the video setting item, and the audio setting item, respectively. As a result, the input item, the channel setting item, the video setting item, and the audio setting item may be controlled.

Figure 11C:
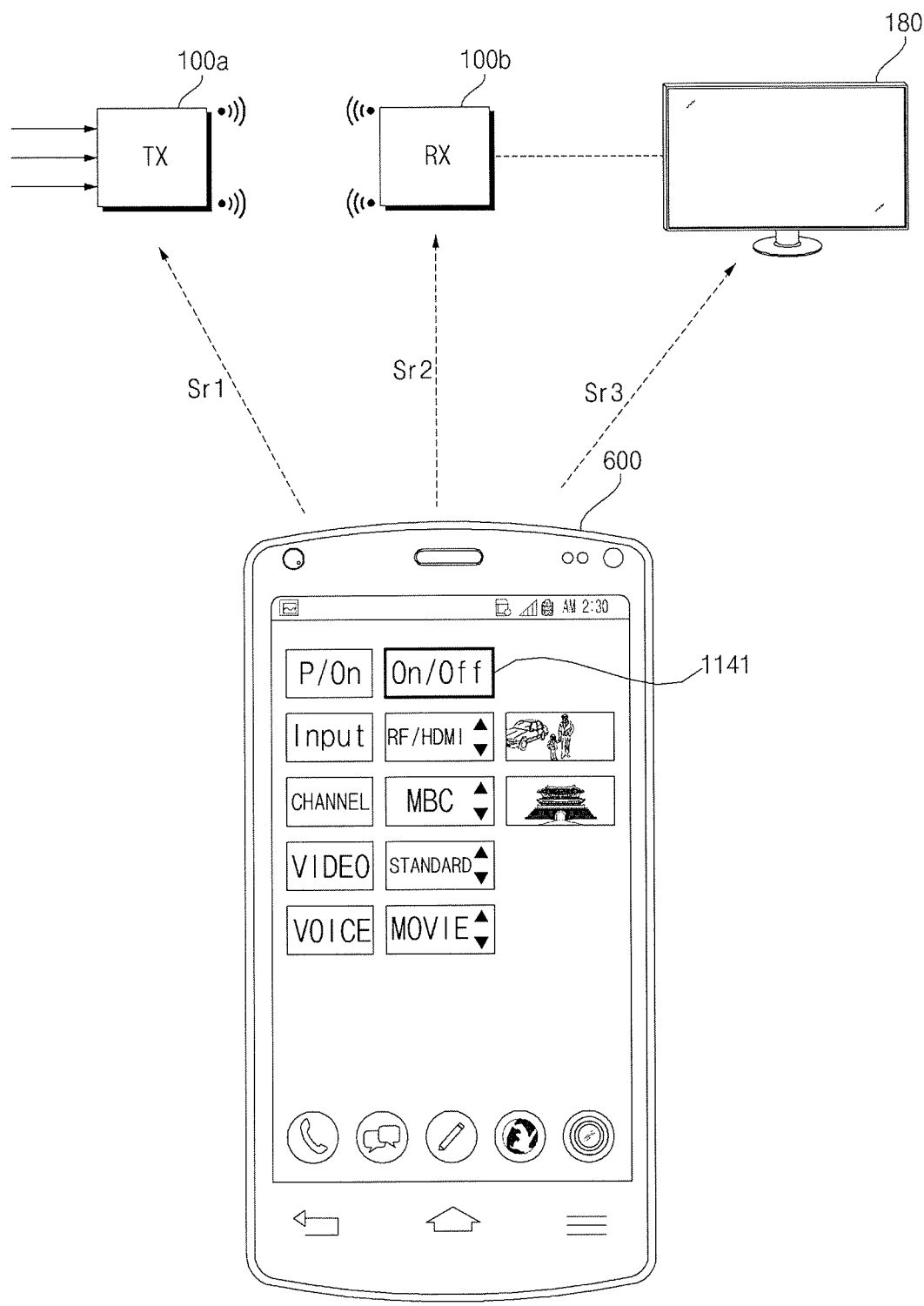

When the power on item is selected in the content playback setting screen 1120, the controller 670 of the mobile terminal 600 can transmit power on signals Sr1, Sr2, and Sr3 to the content transmission device 100*a*, the content reception device 100*b*, and the display device 180, respectively, as shown in FIG. 11C.

After the content transmission device 100*a* is powered on in response to the power on signal, the controller 670 of the mobile terminal 600 can display a thumbnail image corresponding to the input item based on the reception of the thumbnail image corresponding to the input item from the content transmission device 100*a*. That is, the thumbnail image shown in FIGS. 11B and 11C may be a thumbnail image received from the content transmission device 100*a* after the content transmission device 100*a* is powered on and pairing is performed.

After the content transmission device 100*a* is powered on in response to the power on signal, the controller 670 of the mobile terminal 600 can transmit a pairing signal to the content transmission device 100*a*, and can perform a control operation to the mobile terminal 600 is connected to the content transmission device 100*a* based on a pairing response signal received from the content transmission device 100*a*.

Figure 11D:
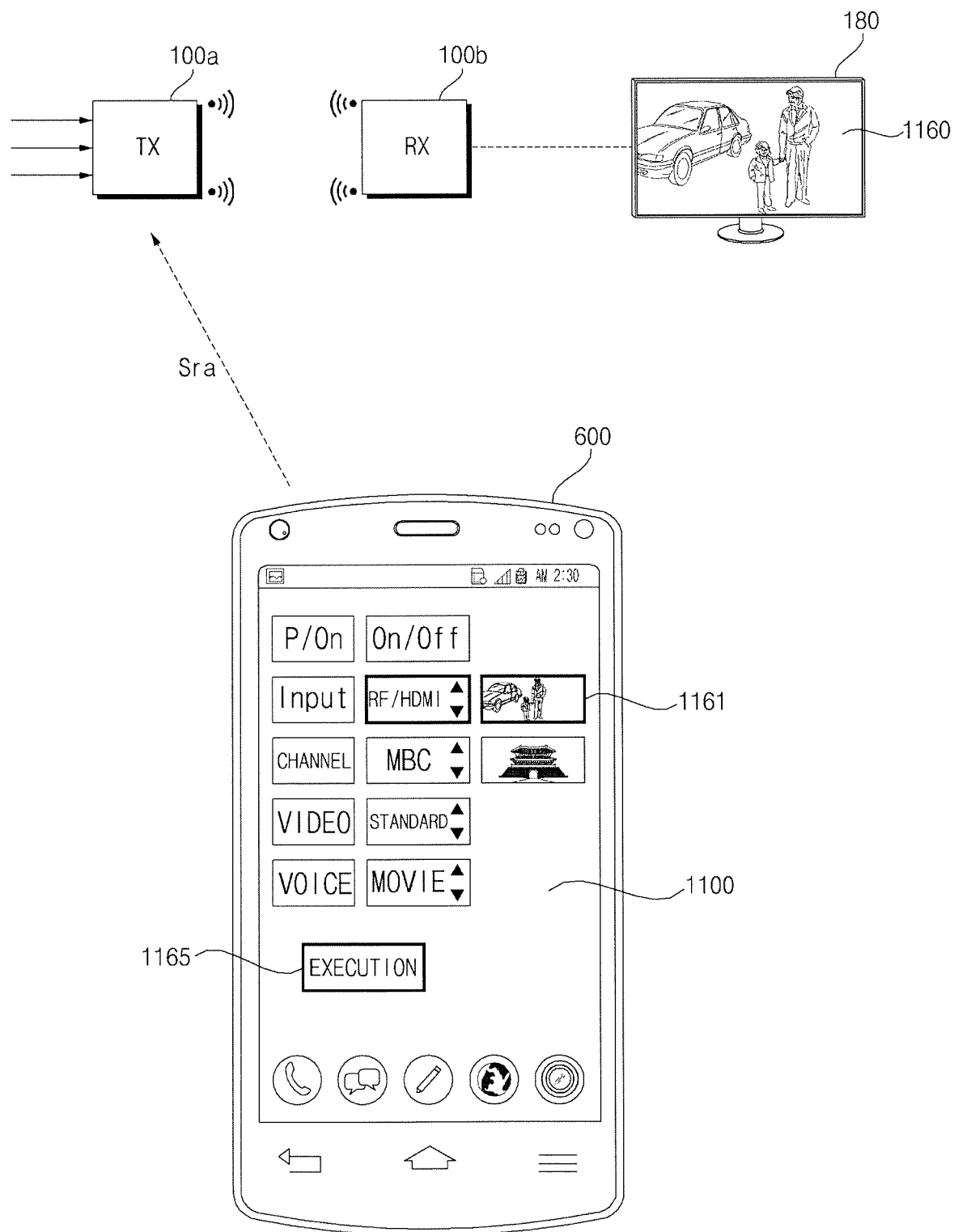

The controller 670 of the mobile terminal 600 can transmit a remote control signal to the content transmission device 100*a* based on the selection of the first input terminal as the input item in the content playback setting screen 1120. In addition, FIG. 11D shows when a thumbnail image 1161 is highlighted as the result of selecting an RF/HDMI item. In this instance, the controller 670 of the mobile terminal 600 can transmit a remote control signal Sra, including information about the selection of the RF/HDMI item to the content transmission device 100*a*.

The power on signals Sr1, Sr2, and Sr3 shown in FIG. 11C and the remote control signal Sra shown in FIG. 11D may be based on different communication schemes. Further, the power on signals Sr1, Sr2, and Sr3 shown in FIG. 11C may be IR signals, and the remote control signal Sra shown in FIG. 11D may be an RF signal. When an execution item 1165 shown in FIG. 11D is selected, the controller 670 of the mobile terminal 600 can transmit a remote control signal including information about the start of transmission to the content transmission device 100*a*.

Consequently, the content transmission device 100*a* can start to transmit content data to the content reception device 100*b*. As a result, a corresponding video 1160 can be displayed through the display device 180.

Figure 12A:
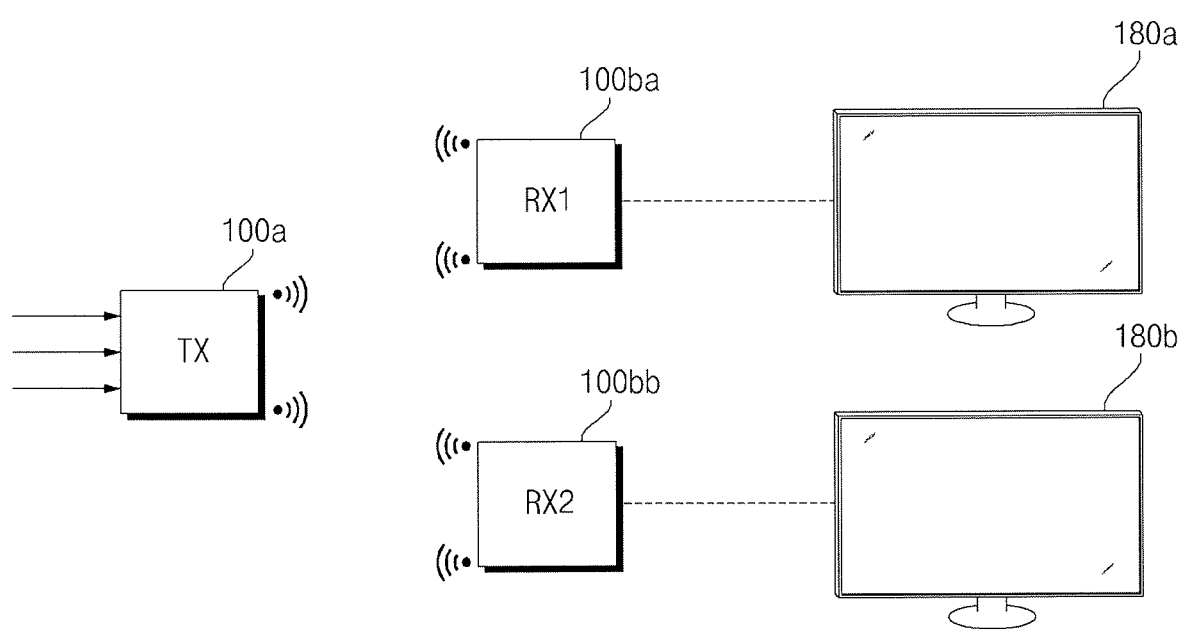
Figure 12B:
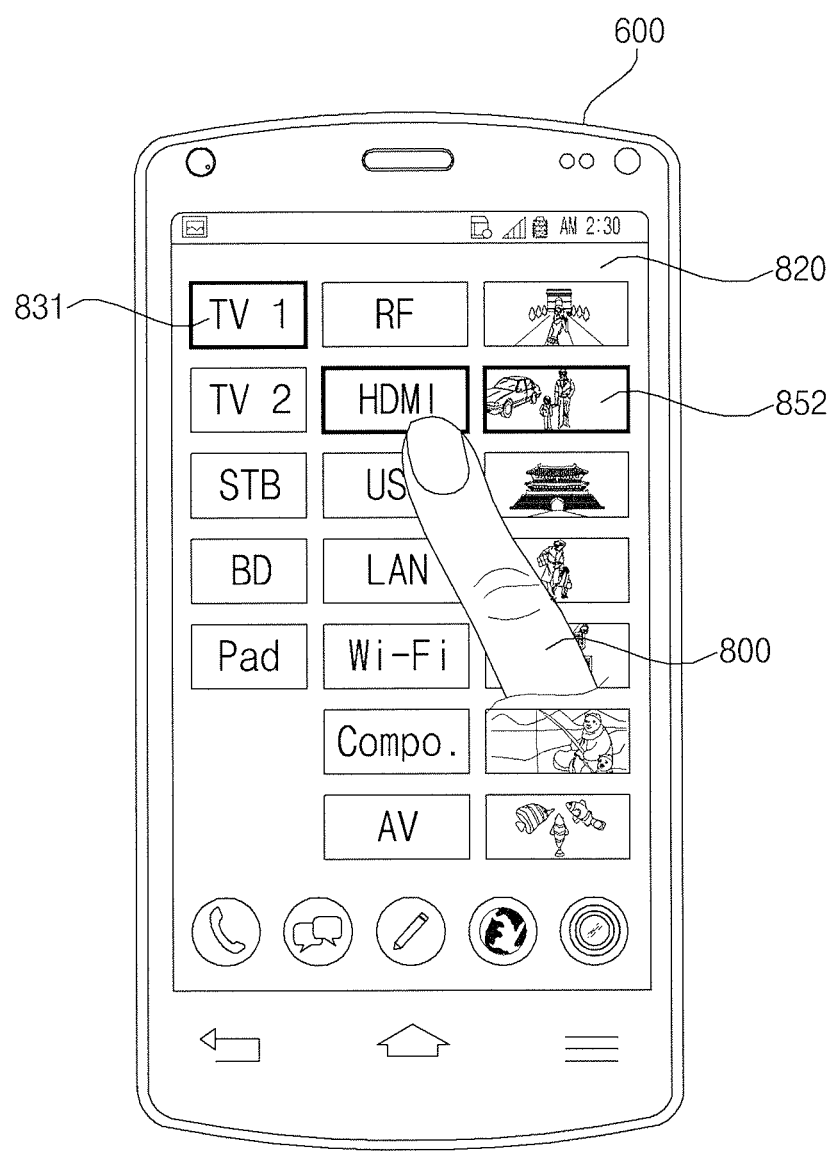
Figure 12C:
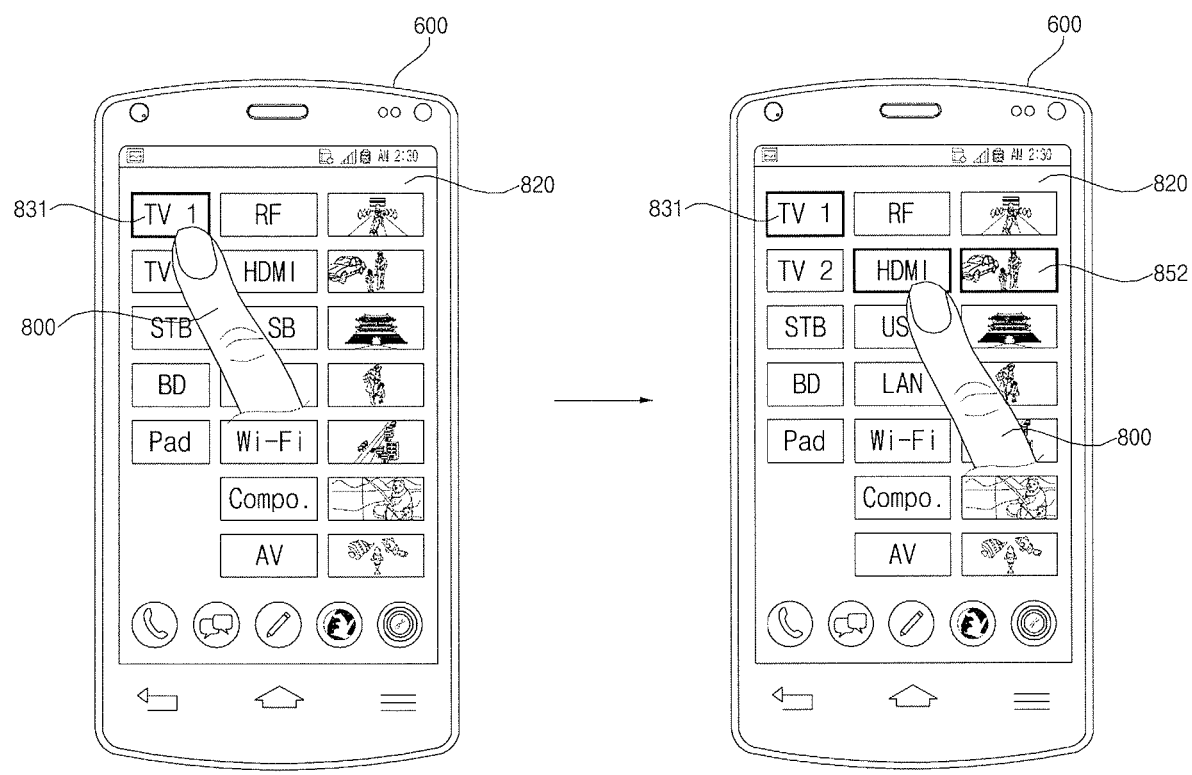

Next, FIG. 12A shows a content transmission device 100*a*, a plurality of content reception devices 100*ba* and 100*bb*, and a plurality of display devices 180*a* and 180*b*. FIGS. 12B and 12C show when a TV1 item 831 and an HDMI item are selected in the content playback setting screen 820.

Figure 12D:
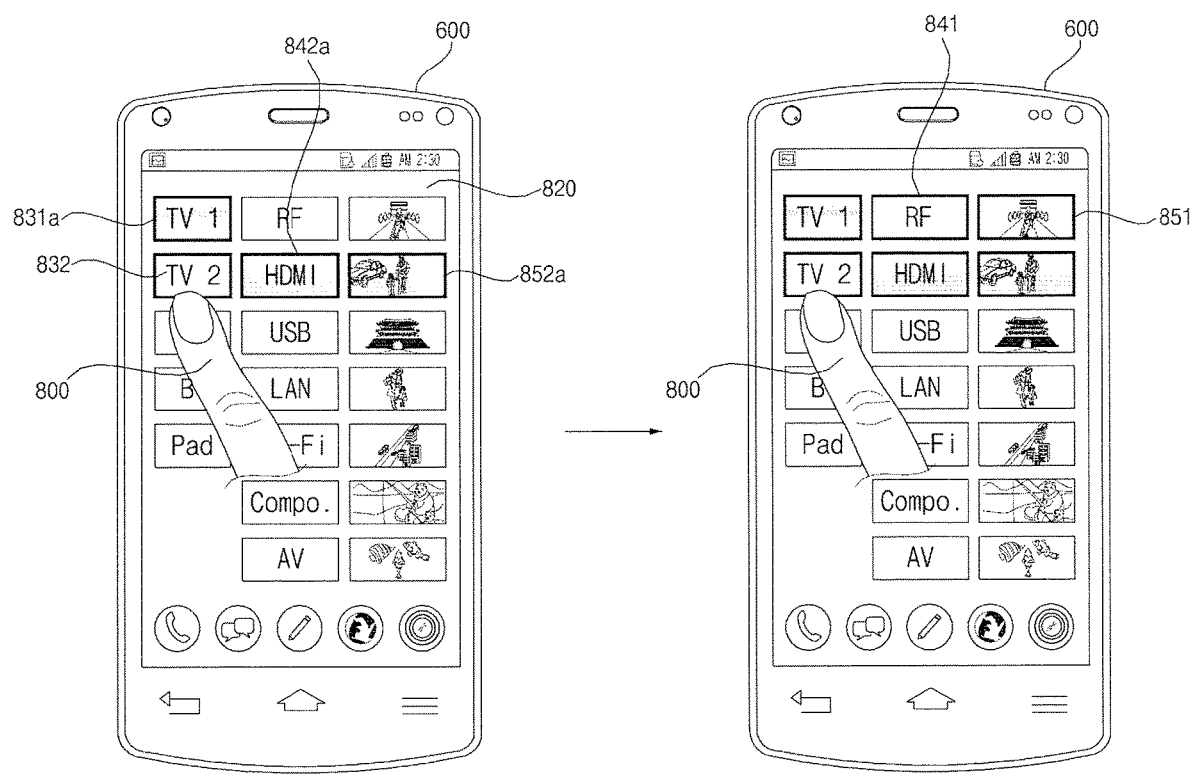

In addition, FIG. 12D shows when a TV2 item 832 and an RF item 841 are further selected when the TV1 item 831 and the HDMI item are selected in the content playback setting screen 820. When a second content reception device 100*bb* is further selected from among the at least one content reception device 100*b* and a second input terminal is further selected from among the input terminals, the controller 670 of the mobile terminal 600 can display the first content reception device 100*ba* and the first input terminal, which have already been selected, in a highlighted state, as shown in FIG. 12D.

That is, FIG. 12D shows a highlighted TV2 item 831*a* and a highlighted HDMI item 842*a*. When the second content reception device 100*bb* is further selected from among the at least one content reception device 100*b* and the second input terminal is further selected from among the input terminals, the controller 670 of the mobile terminal 600 can transmit second content data received through the second input terminal of the content transmission device 100*a* to the second content reception device 100*bb*.

Figure 12E:
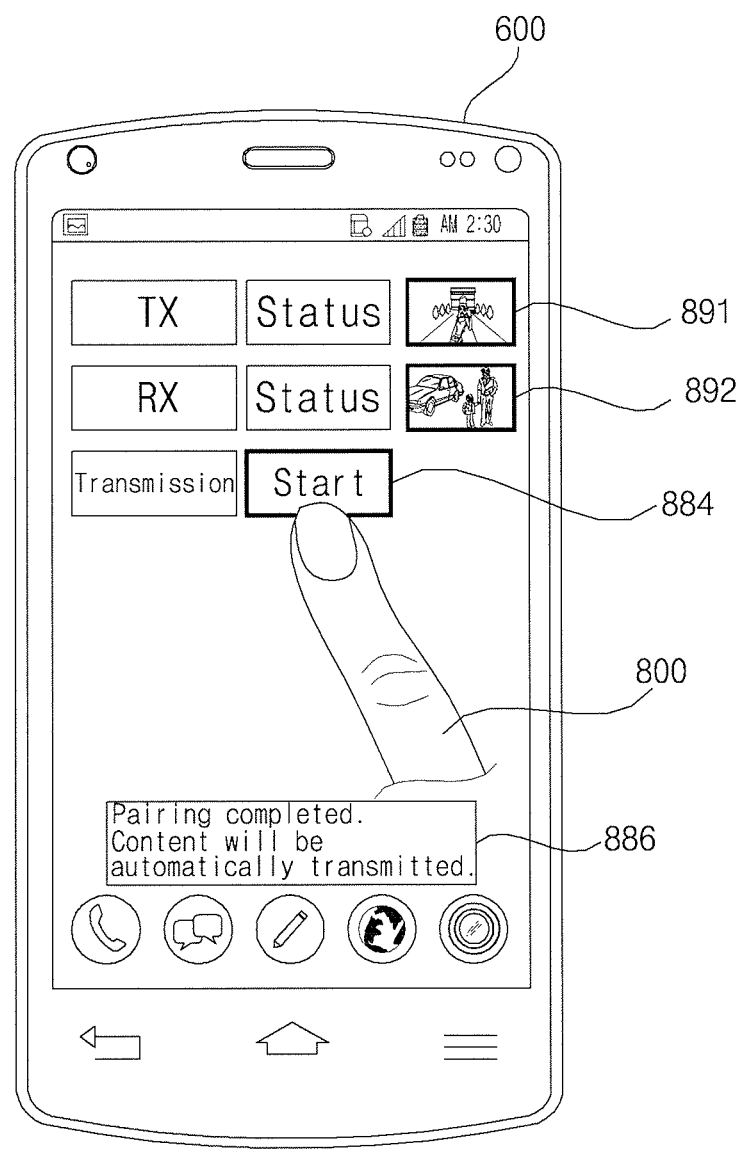

Next, FIG. 12E shows when a screen for wireless transmission is displayed after a plurality of content reception devices is selected and a plurality of input terminals is selected. The screen for wireless transmission may include a transmission setting item, a reception setting item, thumbnail images 891 and 892 corresponding two content data to be transmitted, and a transmission start item 884.

After wireless pairing between the content transmission device 100*a* and the first content reception device 100*ba* and between the content transmission device 100*a* and the second content reception device 100*bb* has been completed, the controller 670 of the mobile terminal 600 can display a transmission start object 886 for transmission of content data, as shown in FIG. 12E.

Figure 12F:
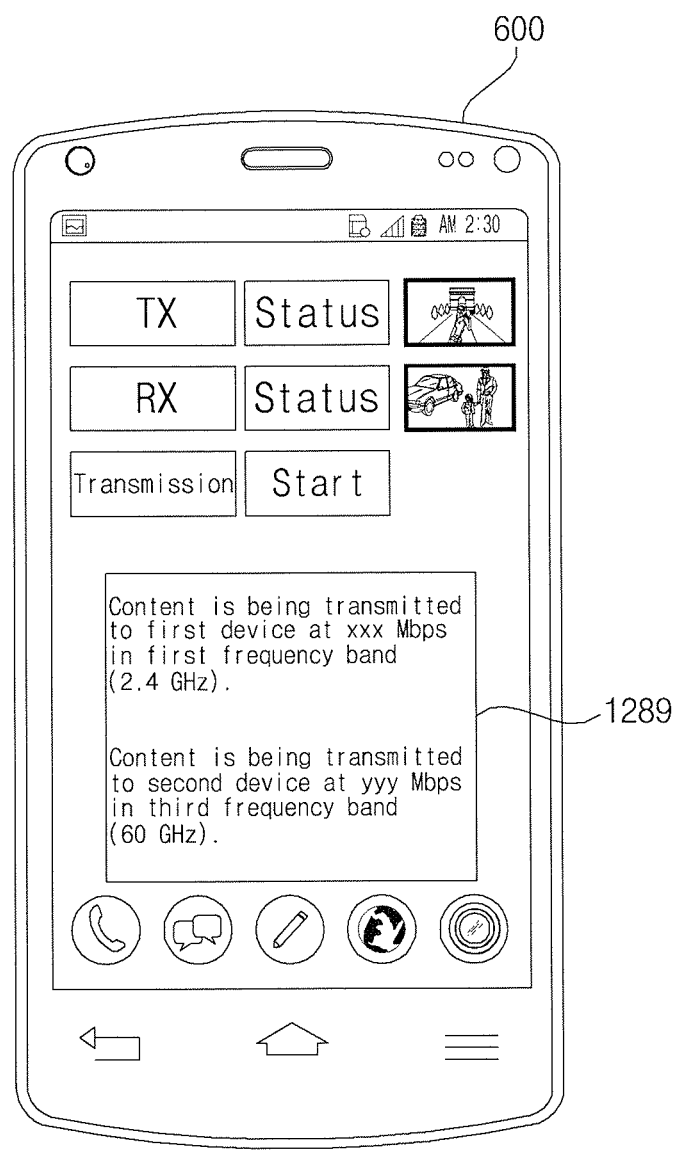

As the result of selecting the transmission start item 884, the content transmission device 100*a* can start to transmit content data to the first content reception device 100*ba* and to the second content reception device 100*bb*, and the controller 670 of the mobile terminal 600 can display an object 1289 indicating that content data are being transmitted to the first content reception device 100*ba* and the second content reception device 100*bb* in different frequency bands, as shown in FIG. 12F.

Figure 12G:
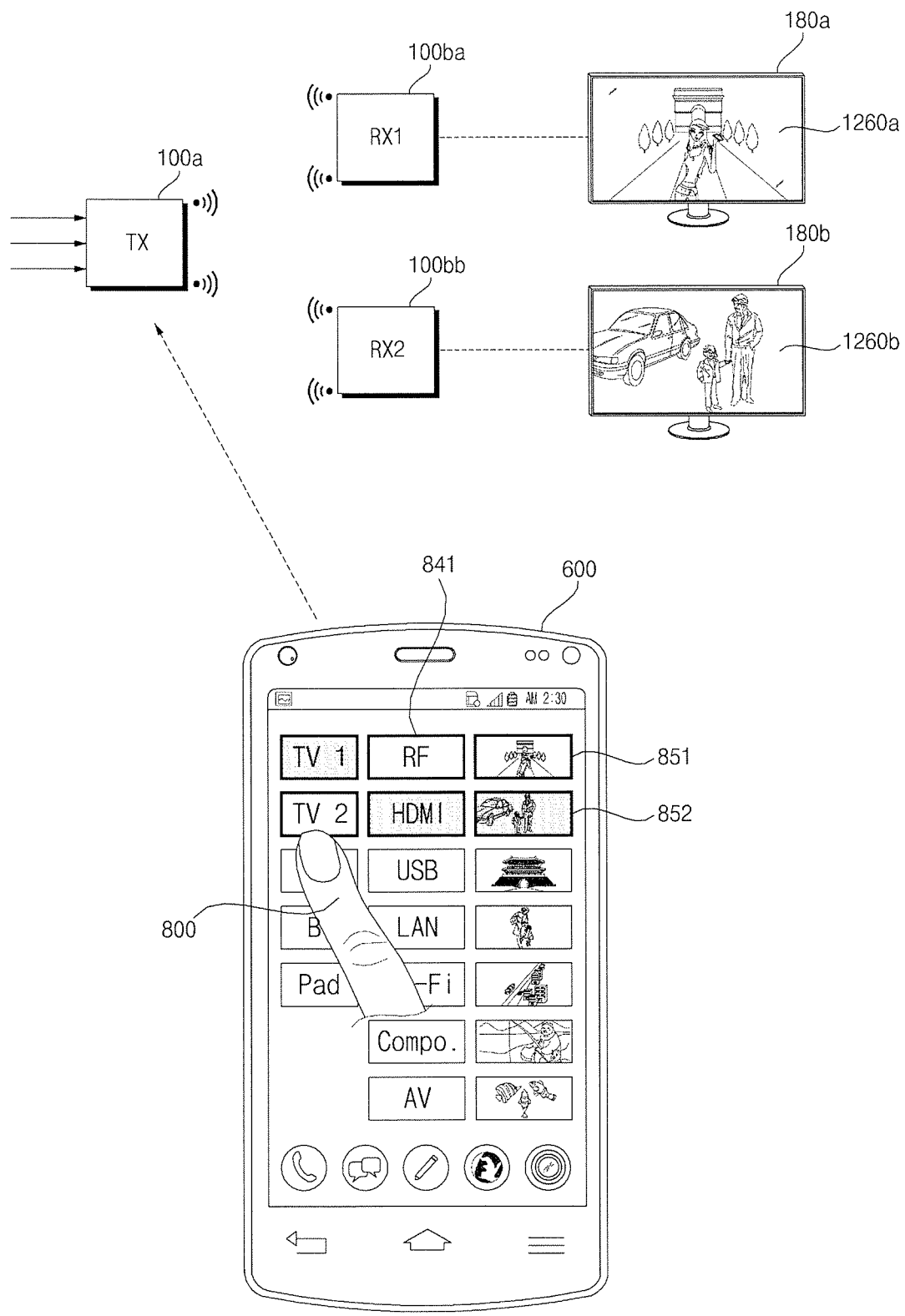

Next, FIG. 12F shows when an object 1289 indicating that content data are being transmitted to the first content reception device 100*ba* in a first frequency band and to the second content reception device 100*bb* in a third frequency band is displayed. When the content transmission device 100*a* starts to transmit content data to the first content reception device 100*ba* and to the second content reception device 100*bb* as the result of selecting the transmission start item 884, a first video 1260*a* can be displayed through the first display device 180*a* corresponding to the first content reception device 100*ba*, and a second video 1260*b* can be displayed through the second display device 180*b* corresponding to the second content reception device 100*bb*, as shown in FIG. 12G. As a result, users can view desired videos.

As is apparent from the above description, a mobile terminal according to an embodiment of the present invention includes a display unit, a communication unit to transmit a control signal to a content transmission device, and a controller to display a content playback setting screen, including an item related to at least one content reception device, an item related to at least one input terminal through which the at least one content reception device is connected to the content transmission device, and a thumbnail image corresponding to the item related to the at least one input terminal, in response to an input for the execution of a content playback application, wherein the controller performs a control operation to transmit content data received through a first input terminal of the content transmission device to a first content reception device based on the selection of the first content reception device from among the at least one content reception device and the selection of the first input terminal from among the at least one input terminal. Consequently, it is possible to easily perform the transmission of content from the content transmission device.

The controller of the mobile terminal performs a control operation to display a screen for wireless pairing between the content transmission device and the first content reception device in response to the selection of the first content reception device from among the at least one content reception device and the selection of the first input terminal from among the at least one input terminal. Consequently, it is possible to perform pairing between the content transmission device and the content reception device before the transmission of content such that the transmission of content can be easily performed.

The controller of the mobile terminal performs a control operation to display, when the content transmission device transmits the content data to the first content reception device in a first frequency band, a first object indicating that the content data are being transmitted in the first frequency band, such that when the content transmission device transmits the content data to the first content reception device in a second frequency band, a second object indicating that the content data are being transmitted in the second frequency band is displayed, and such that when the content transmission device transmits the content data to the first content reception device in a third frequency band, a third object indicating that the content data are being transmitted in the third frequency band is displayed. Consequently, it is possible to easily recognize the frequency band in which the content transmission device is transmitting content data to the content reception device.

The controller of the mobile terminal performs a control operation to display thumbnail images corresponding to the items related to the input terminals in the content playback setting screen in the state in which the number of the thumbnail images is changed based on the item related to the content reception device that is selected. Consequently, it is possible to easily recognize viewable content received through each input terminal.

The controller of the mobile terminal performs a control operation to receive the content data and display the received content data in a portion of the screen and such that information set based on a setting input of at least one selected from among the image size, playback time, fast-forward, and volume of a video based on the displayed content data is transmitted to the content transmission device. Consequently, it is possible to improve user convenience.

When a second content reception device is further selected from among the at least one content reception device and a second input terminal is further selected from among the at least one input terminal, the controller of the mobile terminal performs a control operation to further transmit second content data received through the second input terminal of the content transmission device to the second content reception device. Consequently, it is possible to transmit a plurality of content data.

In addition, a mobile terminal according to another embodiment of the present invention includes a display unit, a communication unit to transmit a control signal to a content transmission device, and a controller to display a content playback setting screen, including a power on item, a power off item, an input item, and a thumbnail image corresponding to the input item, in response to an input for the execution of a content playback application, wherein the controller performs a control operation to transmit content data received through a first input terminal of the content transmission device to a content reception device based on the selection of the first input terminal as the input item. Consequently, it is possible to easily perform the transmission of content from the content transmission device.

The controller of the mobile terminal performs a control operation to transmit power on signals to the content transmission device and to the content reception device when the power on item in the content playback setting screen is selected. Consequently, it is possible to power on the content transmission device, etc.

After the content transmission device is powered on in response to the power on signal, the controller of the mobile terminal performs a control operation to transmit a pairing signal to the content transmission device and is connected to the content transmission device based on a pairing response signal received from the content transmission device.

In addition, a content transmission device according to an embodiment of the present invention includes a communication unit to exchange data with a mobile terminal, an interface unit having a plurality of input terminals to receive content data from a plurality of external devices, and a controller to transmit, when receiving, from the mobile terminal, a remote control signal in response to the selection of a first content reception device from among at least one content reception device and the selection of a first input terminal from among the input terminals, content data received through the first input terminal of the content transmission device to the first content reception device. Consequently, it is possible to easily perform the transmission of content from the content transmission device.

In addition, when receiving, from the mobile terminal, the remote control signal in response to the selection of the first content reception device from among the at least one content reception device and the selection of the first input terminal from among the input terminals, the controller of the content transmission device performs a control operation to transmit a pairing signal to the first content reception device and pairing is performed based on a pairing response signal received from the first content reception device, and, after the pairing has been completed, the controller of the content transmission device performs a control operation to transmit the content data received through the first input terminal of the content transmission device to the first content reception device. Consequently, it is possible to easily perform the transmission of content from the content transmission device.

The controller of the content transmission device performs a control operation to transmit the content data received through the first input terminal of the content transmission device to the first content reception device in any one selected from among a first frequency band to a third frequency band depending on the state of wireless connection between the content transmission device and the first content reception device. Consequently, it is possible to transmit content data without loss or delay.

The operation method of the content transmission device and the mobile terminal according to an embodiment of the present invention may be implemented as code that can be written on a processor-readable recording medium and thus read by a processor provided in each device. The processor-readable recording medium may be any type of recording device in which data are stored in a processor-readable manner. The processor-readable recording medium may include, for example, a read only memory (ROM), a random access memory (RAM), a compact disk read only memory (CD-ROM), a magnetic tape, a floppy disk, and an optical data storage device, or may be implemented in the form of a carrier wave transmitted over the Internet. In addition, the processor-readable recording medium can be distributed over a plurality of computer systems connected to a network such that processor-readable code is written thereto and executed therefrom in a distributed manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A mobile terminal comprising:
a display;
a wireless communication processor configured to transmit a control signal to a content transmission device; and
a controller configured to:
in response to an input for an execution of a content playback application, display a content playback setting screen on the display including:
a plurality of content reception devices,
a plurality of input terminals of the content transmission device through which the plurality of content reception devices are connected to the content transmission device, and
a plurality of thumbnail images corresponding to content data respectively input via the plurality of input terminals,
in response to a selection of a first content reception device among the plurality of content reception devices and a selection of a first thumbnail image corresponding to a first content, transmit data of the first content from the content transmission device to the first content reception device, display the first thumbnail image corresponding to the first content during transmitting the first content, in response to a selection of the first thumbnail image, display a playback time setting object regarding the first content, and in response to a selection of a previous time in the playback time setting object, transmit information regarding the previous time to the content transmission device, and
in response to a selection of a second content reception device among the plurality of content reception devices and a selection of a second thumbnail image corresponding to a second content, transmit data of the second content from the content transmission device to the second content reception device,
wherein a communication method or a frequency band between the content transmission device and the first content reception device is different from a communication method or a frequency band between the content transmission device and the second content reception device.

2. The mobile terminal according to claim 1, wherein the communication method between the content transmission device and the first content reception device includes a Wi-Fi communication method, and
wherein the communication method between the content transmission device and the second content reception device includes a WiGig or WiHD communication method.

3. The mobile terminal according to claim 1, wherein the first content and the second content are a same content.

4. The mobile terminal according to claim 1, wherein the first content and the second content are a same content, and respectively displayed on a first display connected to the first content reception device and a second display connected to the second content reception device.

5. The mobile terminal according to claim 1, wherein the controller is further configured to:
in response to the selection of the first content reception device among the plurality of content reception devices and a selection of a first input terminal among the plurality of input terminals, transmit the data of the first content received through the first input terminal of the content transmission device to the first content reception device, and
in response to the selection of the second content reception device among the plurality of content reception devices and a selection of a second input terminal among the plurality of input terminals when the first content reception device and the first input terminal are selected, transmit the data of the second content received through the second input terminal of the content transmission device to the second content reception device.

6. The mobile terminal according to claim 1, wherein when the first content reception device and the content transmission device are not paired when the first content reception device and the first input terminal are selected, display a screen for wireless pairing the content transmission device and the first content reception device, wherein the screen for wireless pairing includes a pairing item,
wherein in response to a selection of the pairing item, a control signal for performing pairing between the content transmission device and the first content reception device is transmitted to the content transmission device, and a pairing completion signal is received from the content transmission device after pairing between the content transmission device and the first content reception device is completed,
wherein, in response to the received pairing completion signal, the controller is configured to switch the pairing item to a start item and to display the start item, and
wherein in response to a selection of the start item, a data transmission start signal is transmitted to the content transmission device.

7. The mobile terminal according to claim 1, wherein the controller is further configured to sequentially display the plurality of thumbnail images based on the plurality of thumbnail images being sequentially received from the content transmission device.

8. The mobile terminal according to claim 1, wherein the controller is further configured to:
transmit a pairing signal to the content transmission device in response to an input for the execution of the content playback application, and
connect the mobile terminal to the content transmission device based on a pairing response signal received from the content transmission device.

9. The mobile terminal according to claim 1, wherein the controller is further configured to receive the first content data and to display the received first content data in a portion of the display.

10. The mobile terminal according to claim 1, wherein the controller is further configured to transmit information set based on a setting input of at least one selected from among an image size, a playback time, a fast-forward, and a volume of a video based on the first content data to the content transmission device.

11. The mobile terminal according to claim 1, wherein the controller is further configured to:
- in response to a selection of the second content reception device and a selection of a second input terminal among the plurality of input terminals when the first content reception device and the first input terminal are selected, transmit the second content data received through the second input terminal of the content transmission device to the second content reception device, and
- in response to the selection of the second content reception device and the selection of the second input, highlight the first content reception device and the first input terminal, which have already been selected.

12. A video display system comprising:
- a first content reception device configured to receive a data of a first content from a content transmission device;
- a first display configured to receive the data of the first content from the first content reception device and display a first video corresponding to the data of the first content;
- a second content reception device configured to receive a data of a second content from the content transmission device;
- a second display configured to receive the data of the second content from the second content reception device and display a second video corresponding to the data of the second content; and
- in response to a selection of the first content reception device and a selection of a first thumbnail image corresponding to a first content, transmit data of the first content from the content transmission device to the first content reception device, display the first thumbnail image corresponding to the first content during transmitting the first content, in response to a selection of the first thumbnail image, display a playback time setting object regarding the first content, and in response to a selection of a previous time in the playback time setting object, transmit information regarding the previous time to the content transmission device,
- wherein a communication method or a frequency band between the content transmission device and the first content reception device is different from a communication method or a frequency band between the content transmission device and the second content reception device, and
- wherein, in response to change of playback time during receiving the first content, the first content reception device is configured to receive the first content data from the changed playback time from the content transmission device.

13. The video display system according to claim 12, wherein the communication method between the content transmission device and the first content reception device includes a Wi-Fi communication method, and
- wherein the communication method between the content transmission device and the second content reception device includes a WiGig or WiHD communication method.

14. The video display system according to claim 12, wherein the first content and the second content are a same content.

15. The video display system according to claim 12, wherein the first video and the second video are a same video, and are respectively displayed on the first display and the second display.

16. The video display system according to claim 12, wherein the content transmission device is configured to:
- in response to the selection of the first content reception device and a selection of a first input terminal of the content transmission device, transmit the data of the first content received through the first input terminal of the content transmission device to the first content reception device, and
- in response to the selection of the second content reception and a selection of a second input terminal of the content transmission device when the first content reception device and the first input terminal are selected, transmit the data of the second content received through the second input terminal of the content transmission device to the second content reception device.

17. The video display system according to claim 12, wherein the content transmission device is configured to:
- receive, from a mobile terminal, a first remote control signal corresponding to a selection of the first content reception device, and
- in response to the first remote control signal, transmit the data of the first content to the first content reception device,
- receive, from the mobile terminal, a second remote control signal corresponding to a selection of the second content reception device, and
- in response to the second remote control signal, transmit the data of the second content to the second content reception device.

18. The video display system according to claim 12, further comprising:
- a mobile terminal configured to:
- transmit a first remote control signal corresponding to a selection of the first content reception device to the content transmission device, or
- transmit a second remote control signal corresponding to a selection of the second content reception device to the content transmission device.

19. The video display system according to claim 12, wherein the first display and the second display are spaced apart and disposed in different spaces.

* * * * *